United States Patent [19]
Niibori et al.

[11] Patent Number: 5,808,707
[45] Date of Patent: Sep. 15, 1998

[54] DISPLAY APPARATUS

[75] Inventors: Kenji Niibori; Masanori Takahashi, both of Chigasaki; Yasushi Shioya, Atsugi; Takashi Satoh, Hiratsuka, all of Japan

[73] Assignee: Canon Kabushiki Kaisha, Tokyo, Japan

[21] Appl. No.: 606,946

[22] Filed: Feb. 26, 1996

[30] Foreign Application Priority Data

| Mar. 1, 1995 | [JP] | Japan | 7-042195 |
| Mar. 3, 1995 | [JP] | Japan | 7-044557 |
| Jul. 3, 1995 | [JP] | Japan | 7-167673 |

[51] Int. Cl.$^6$ .................. G02F 1/1333; G02F 1/1345
[52] U.S. Cl. ................ 349/60; 349/58; 349/150
[58] Field of Search ................ 349/58, 60, 150

[56] References Cited

U.S. PATENT DOCUMENTS

| 4,674,839 | 6/1987 | Tsuboyama et al. | 350/334 |
| 4,964,700 | 10/1990 | Takabayashi | 350/336 |
| 5,019,201 | 5/1991 | Yabu et al. | 156/273.9 |
| 5,150,231 | 9/1992 | Iwamoto et al. | 359/44 |
| 5,270,848 | 12/1993 | Takabayashi et al. | 359/88 |
| 5,360,943 | 11/1994 | Mori et al. | 174/84 |
| 5,438,484 | 8/1995 | Kanada et al. | 362/31 |
| 5,517,208 | 5/1996 | Mori et al. | 345/87 |
| 5,583,681 | 12/1996 | Shioya et al. | 349/60 |
| 5,606,438 | 2/1997 | Margalit et al. | 349/60 |

FOREIGN PATENT DOCUMENTS

| 0638832 | 2/1995 | European Pat. Off. |
| 2178625 | 7/1990 | Japan. |
| 6-230352 | 8/1994 | Japan | 349/60 |

OTHER PUBLICATIONS

Patent Abstracts of Japan, vol. 013, No. 322, (P–902), 20 Jul. 1989 & JP 01 091113 A (Hitachi Ltd.), 10 Apr. 1989, *abstract*.

Patent Abstracts of Japan, vol. 018, No. 614 (P–1830), 22 Nov. 1994 & JP 06 231079 A (Seiko Epson Corp.), 19 Aug. 1994, *abstract*.

Patent Abstracts of Japan, vol. 017, No. 416 (P–1584), 3 Aug. 1993 & JP 05 080307 A (Hitachi Ltd), 2 Apr. 1993, *abstract*.

*Primary Examiner*—William L. Sikes
*Assistant Examiner*—Tiep H. Nguyen
*Attorney, Agent, or Firm*—Fitzpatrick, Cella, Harper & Scinto

[57] ABSTRACT

An impact-resistant display apparatus is constituted by a display panel, a drive circuit for driving the display panel, a face plate disposed in front of the display panel, and a support member for supporting the display panel and the drive circuit. The display apparatus further includes a first elastic member between a rear side of the display panel and the support member, and a second elastic member between a front side of the display panel and the face plate. The first and second elastic members may preferably respectively define and almost closed space together with adjacent associate members so as to provide an air damper-effect.

13 Claims, 14 Drawing Sheets

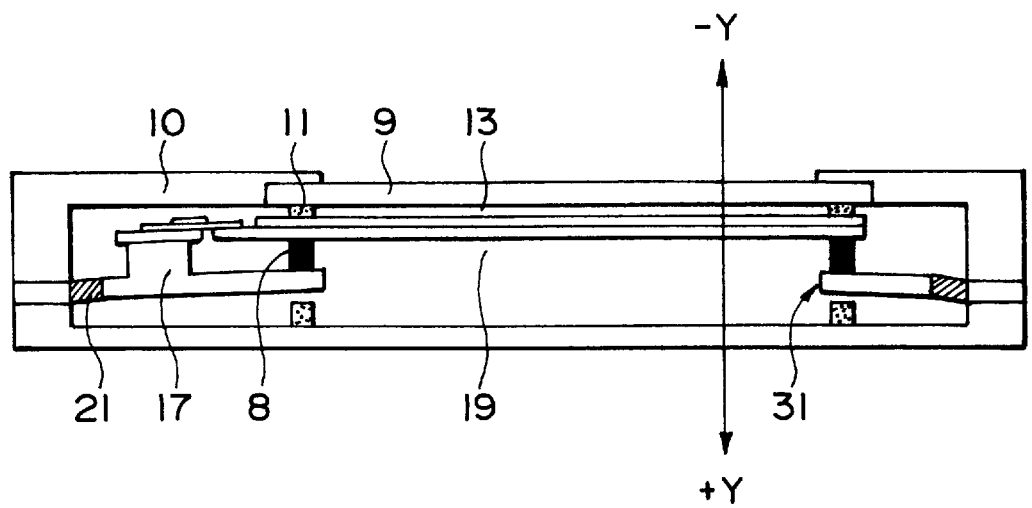
F I G. 11
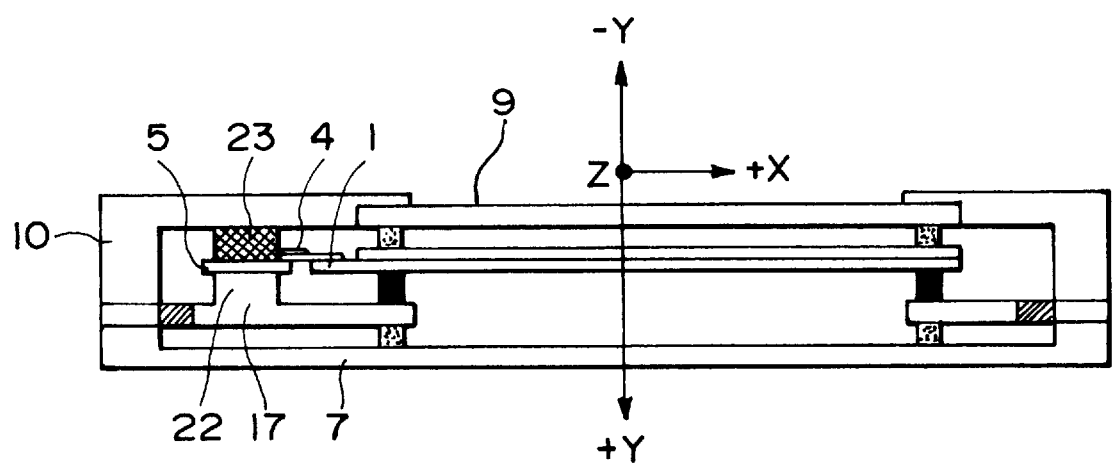
F I G. 12

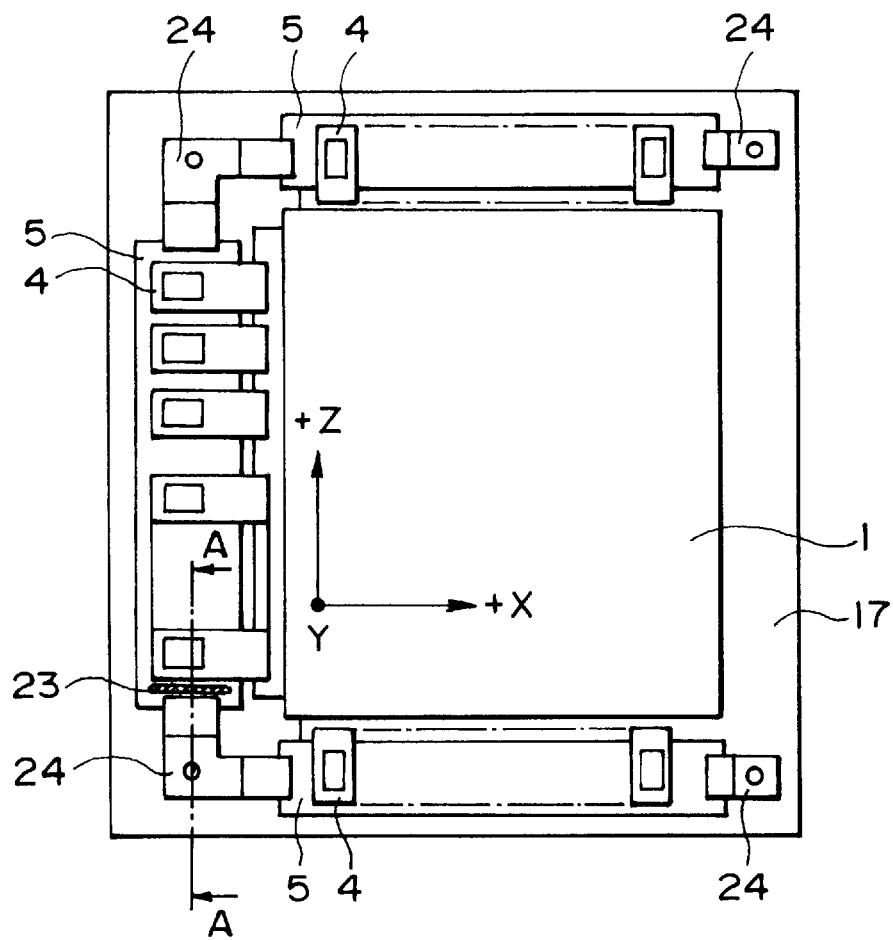
F I G. 13
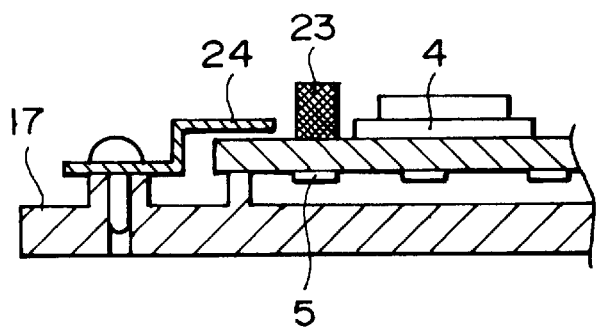
F I G. 14

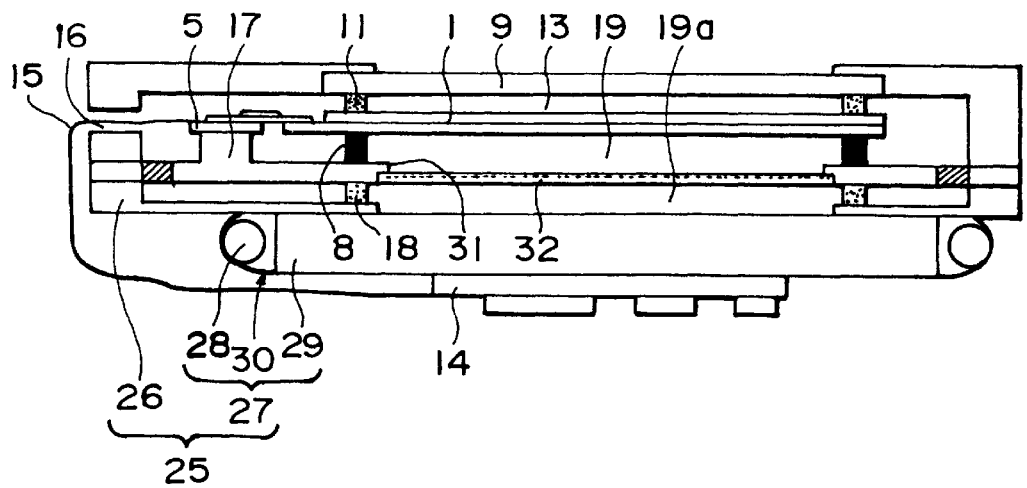
F I G. 15
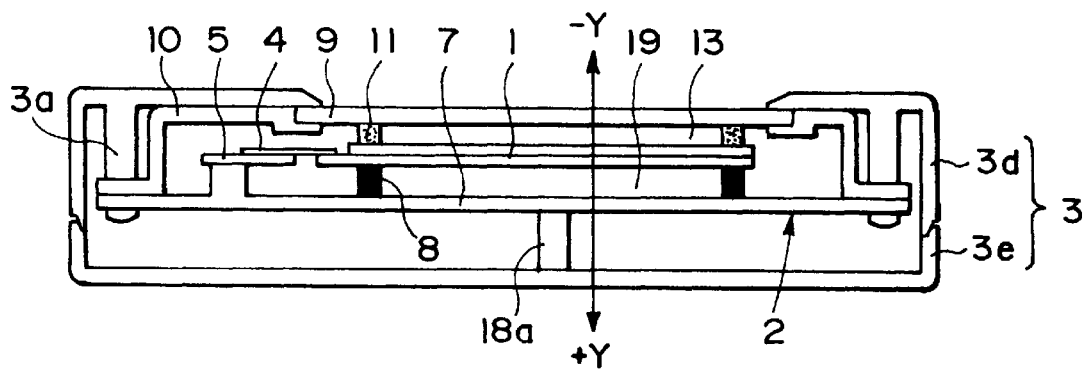
F I G. 16

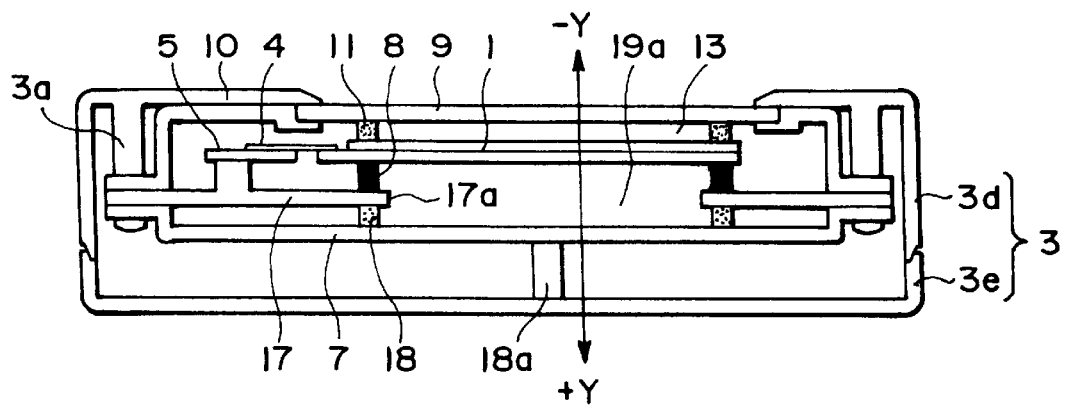
F I G. 17
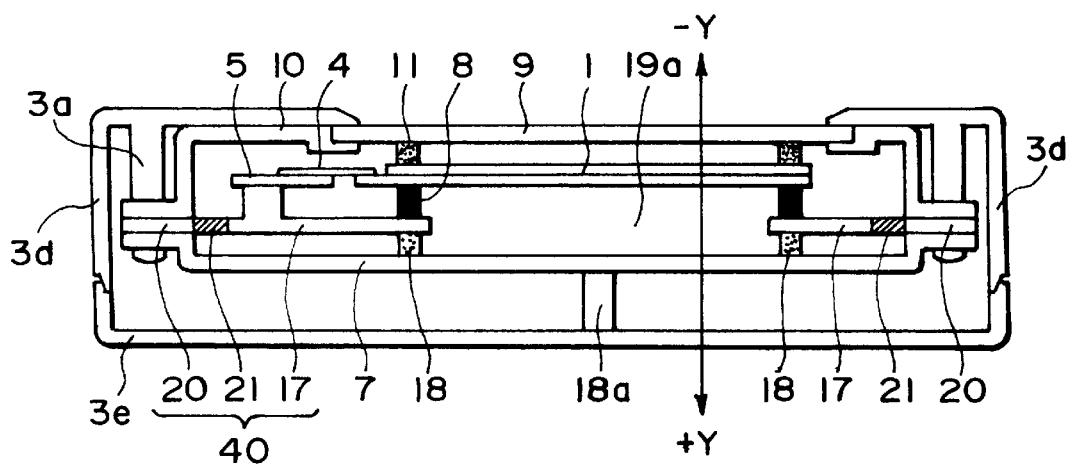
F I G. 18

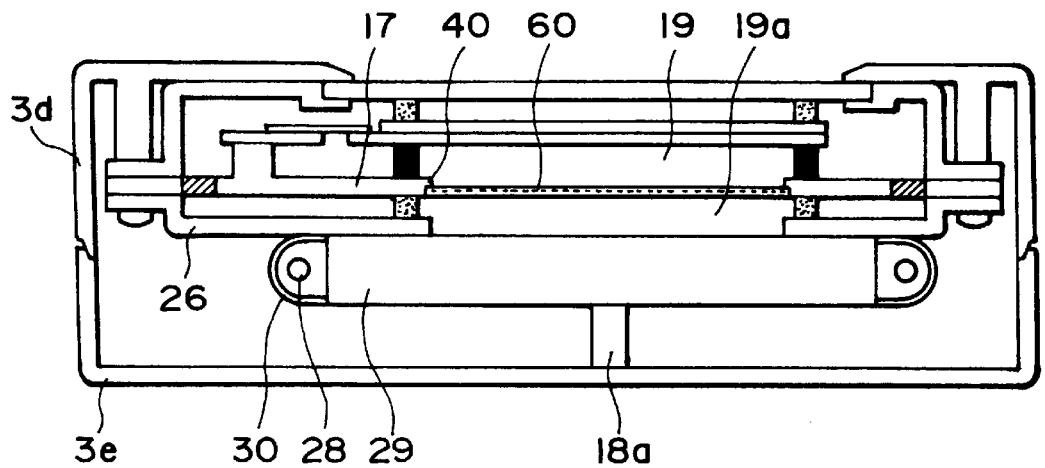
F I G. 21
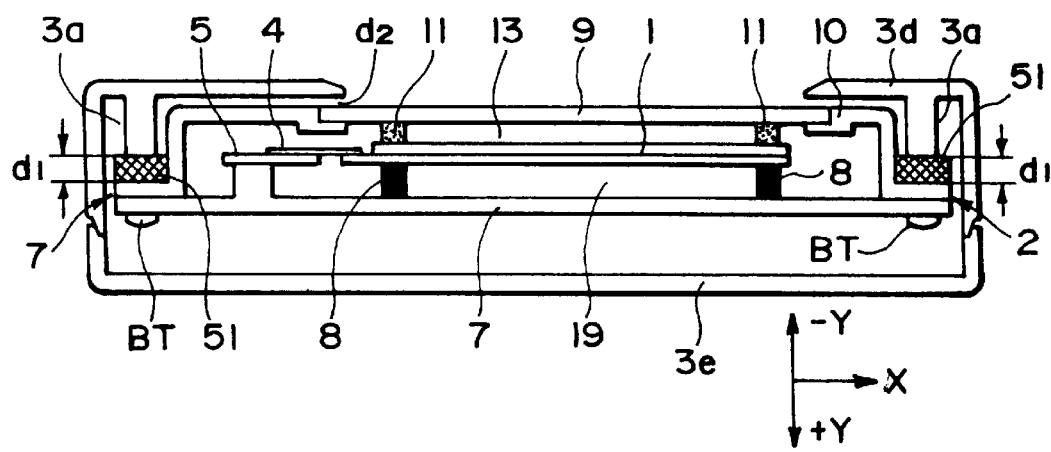
F I G. 22

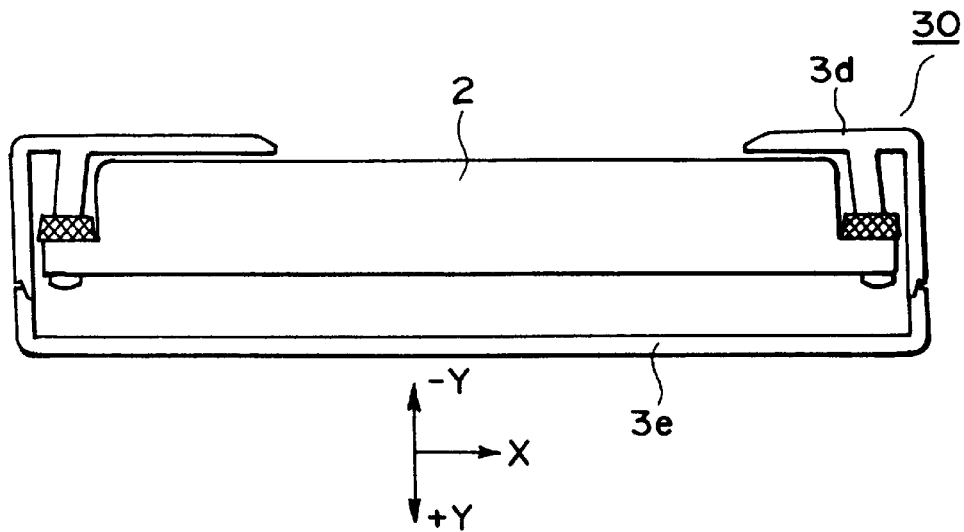
F I G. 23
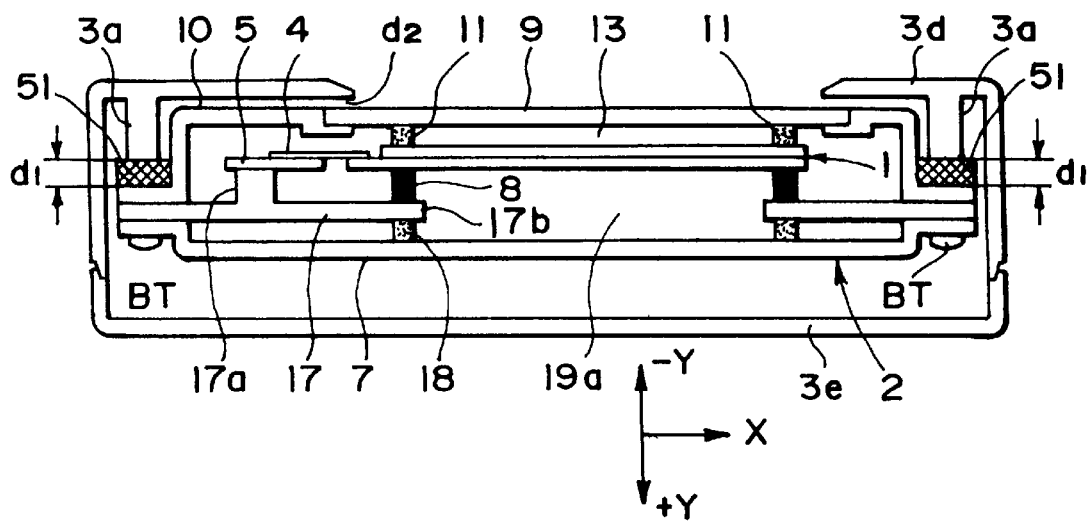
F I G. 24

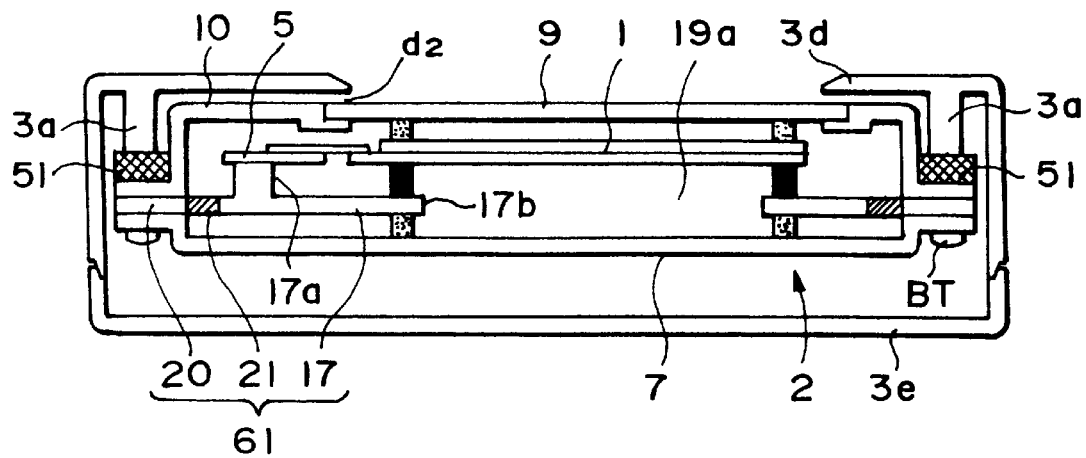
F I G. 25
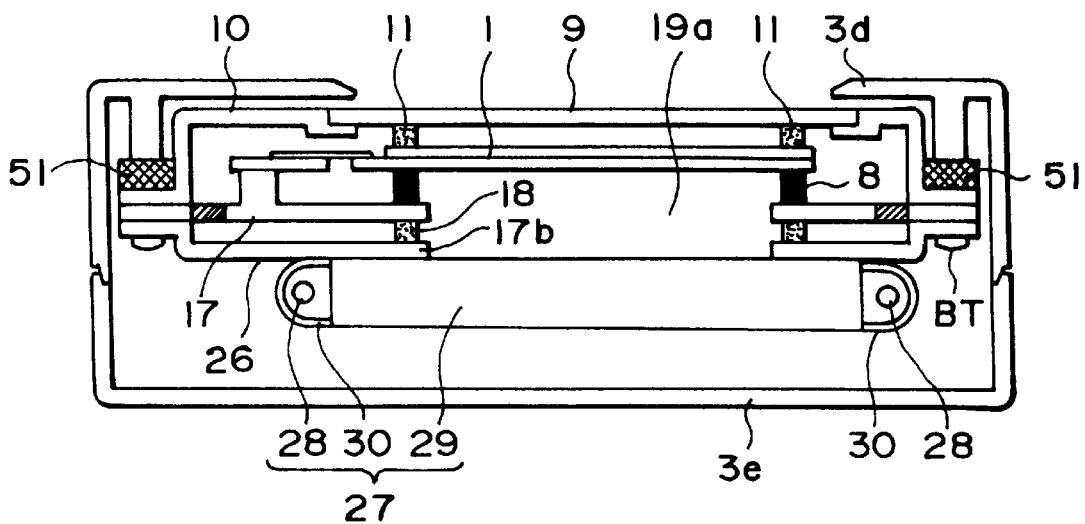
F I G. 26

DISPLAY APPARATUS

FIELD OF THE INVENTION AND RELATED ART

The present invention relates to a display apparatus used in a television receiver, a video projector, a computer terminal, a video camera recorder, a car navigation system, etc., particularly a display apparatus having an impact relaxation structure capable of preventing an adverse effect to a display device caused by an externally applied impact.

Display devices may include: a plasma device, an electrochromic device, a DMD, a liquid crystal device, etc., which are all liable to receive an adverse effect when a strong impact is applied thereto from the outside. In many cases, a good display state can be restored. However, a structure capable of alleviating a strong external impact is desired. An example of such an impact-resistant structure is disclosed in Japanese Laid-Open Patent Application (JP-A) 2-178625, but the structure is not believed to be very practical. Particularly, no pressure-resistant structure applicable to a display device to which a driver IC is attached.

U.S. Pat. No. 5,150,231 has proposed an impact-resistant structure applicable to a connection between a driver IC and a display device or a driver IC and a control circuit.

Hereinbelow, an example of such a known impact-resistant structure applied to a liquid crystal display apparatus, for example, will be described.

A liquid crystal panel as a liquid crystal device fixed to a liquid crystal display apparatus, when subjected to a load, is liable to cause a deterioration in alignment characteristic due to warp or distortion or due to impact or vibration applied thereto, thereby resulting in inferior image quality. Particularly, a smectic liquid crystal is liable to cause the problem, and accordingly the following fixing structure has been proposed (U.S. Pat. No. 5,150,231).

FIGS. 28A and 28B show a stationary state and a state supplied with an impact, respectively, of a display apparatus 100. Referring to FIG. 28A, an adhesive 3 is applied to a periphery surrounding an opening of a panel-fixing plate 2, on which a liquid crystal panel 1 is adhesively fixed, and then a circuit board (hereinafter called "a driver board") 5 for supplying signals and electricity to a liquid crystal drive IC 4 formed by a TAB-scheme is fixed to the panel fixing plate 2. Then, the panel-fixing plate 2 is hung in space via an elastic member 6 at an opening of a fixing plate-supporting member 8 so as to define almost closed spaces thereabove and therebelow.

The reason for forming almost closed spaces below and above the liquid crystal panel is as follows. When the liquid crystal apparatus 100 is dropped in a +y-direction as shown in FIG. 28B, the panel-fixing plate Z is moved in the +Y direction since it is supported by the elastic member 6. At this time, as a closed space is formed below the liquid crystal panel 1, air within the space cannot escape but instead compressed. A resisting force to the compression provides an air damper effect to alleviate the impact applied to the liquid crystal panel 1, whereby the deformation of the liquid crystal panel 1 is suppressed to prevent the deterioration of alignment characteristic and image quality.

However, current display apparatuses are generally required to have a larger panel size with low thickness and weight and it is difficult to retain or even improve the impact resistance while satisfying such requirements. Particularly, the above-mentioned impact-resistant liquid crystal display apparatus encounters the following problems.

(1) When an impact is applied to the liquid crystal apparatus in a +Y direction as shown in FIG. 28B, the liquid crystal panel 1 is also moved in the +Y direction and, as the panel-fixing plate 2 and the elastic member 6 are generally disposed in the same plane, the combined structure including these members is deformed in an arcuate form as shown in FIG. 28B. At this time, the deformation stress of the panel-fixing plate 2 can be transmitted through the adhesive 3 to the liquid crystal panel 1, whereby the liquid crystal panel 1 can be deformed to deteriorate the alignment characteristic and the image quality.

(2) In order to allow the liquid crystal panel 1 and the panel-fixing plate fixing the liquid crystal panel 1 to move for a distance sufficient to absorb the impact, the distance between the panel-fixing plate 2 and the supporting member 10, i.e., the size of elastic member 6, is taken large, so that the entire peripheral size of the liquid crystal display apparatus 100 becomes larger.

(3) For the same reason as (2) above, the distance between a face plate 9 and the liquid crystal panel 1, and the distance between the liquid crystal panel 1 and an illumination member 25 are taken considerably large, so that the entire liquid crystal apparatus is liable to be thick.

(4) Further, in order to suppress a surface reflection at the surface of the face plate 9, it is necessary to apply a non-glare treatment providing an intense haze value to the surface of the face plate 9. In such a case, the characters, etc., displayed on the liquid crystal panel 1 are blurred to be difficult to see if the face plate 9 is distant from the liquid crystal panel 1.

(5) Further, in case where a touch panel (not shown) is disposed on the face plate 9, if the face plate 9 is distant from the liquid crystal panel 1, the distance between the liquid crystal panel 1 and the pen-touched member result in a parallax, which is liable to cause an input failure of an operator touching a pen to a part on the picture not desired by the operator.

(6) An almost closed space is required to be disposed above and below the combination including the liquid crystal panel 1, the panel-fixing plate 2, the liquid crystal drive IC 4, the signal-supply driver board 5 for supplying signals to the drive IC 4 and the elastic member 6. In this case, however, a member defining the almost closed space such as a face plate-supporting member 10 fixedly supporting the face plate 9 has to be provided with a hole for passing, e.g., a cable 15 for supplying signals from a control plate 14 to the driver board 5, etc., so that the cost for increasing the air-tightness is increased.

SUMMARY OF THE INVENTION

In view of the above-mentioned problems, an object of the present invention is to provide a display apparatus capable of withstanding a strong impact without hindering an increase in display area and reductions in thickness and weight of the apparatus.

Another object of the present invention is to provide a display apparatus capable of obviating a deterioration in display performance by input operation even in case where input means such as pen input means or a touch panel is included.

According to the present invention, there is provided a display apparatus, comprising: a display panel, a drive circuit for driving the display panel, a face plate disposed in front of the display panel, and a support member for supporting the display panel and the drive circuit;

said display apparatus further including a first elastic member between a rear side of the display panel and the support member, and a second elastic member between a front side of the display panel and the faceplate.

These and other objects, features and advantages of the present invention will become more apparent upon a consideration of the following description of the preferred embodiments of the present invention taken in conjunction with the accompanying drawings wherein like parts are denoted by like reference numerals.

BRIEF DESCRIPTION OF THE DRAWINGS

FIGS. 1, 2, 4, 8–9, 16–19, 22 and 24–27 are respectively a sectional view of a display apparatus according to an embodiment of the present invention.

FIGS. 10 and 11 illustrate manners of deformation of members in a display apparatus when external forces are applied in +Y direction and –Y direction, respectively.

FIG. 12 illustrates a manner of supporting a driver board in the display apparatus shown in FIG. 9.

FIG. 13 is a plan view of the display apparatus shown in FIG. 12.

FIG. 14 is a cross-sectional view taken along A—A line of the display apparatus shown in FIG. 13.

FIG. 15 is a sectional view of a display apparatus wherein a backlight unit is disposed in place of the housing.

FIG. 21 is a sectional view showing an embodiment wherein a light diffusion sheet is disposed.

FIG. 23 illustrates a function of the display apparatus shown in FIG. 22.

DESCRIPTION OF THE PREFERRED EMBODIMENTS

Figure 1:
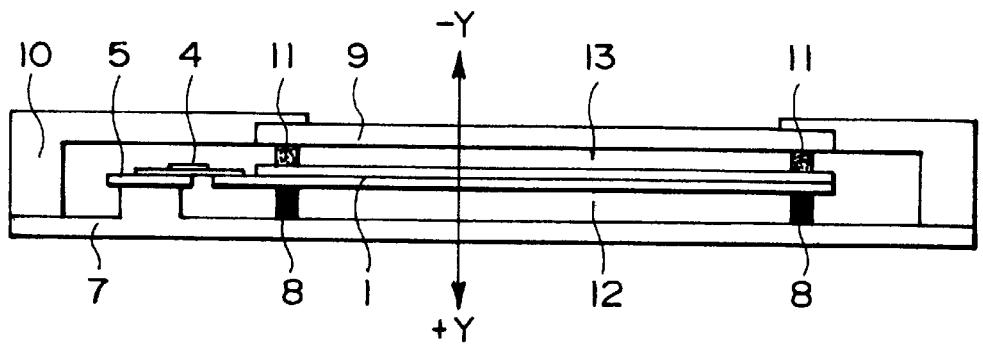

FIG. 1 is a sectional view of a display apparatus according to an embodiment of the present invention. Referring to FIG. 1, the display apparatus includes a display panel 1 as a display device, a flexible circuit 4 comprising a drive IC chip and a rigid circuit plate 5 for supplying signals constituting a drive circuit for driving the display panel 1, a housing member 7 as a support member, a (first) elastic member 8, a face plate 9, a face plate-supporting member, a (second) elastic member 11, a (first) almost closed space 12 and a (second) almost closed space 13.

More specifically, the display apparatus according to this embodiment includes: a display panel 1, a housing member 7 disposed behind and with a spacing from the display panel, and a face plate 9 having a transparent region disposed in front of the display panel; and the display apparatus further includes:
a first elastic member 8 disposed at a position surrounding a display region of the display panel between the display panel 1 and the housing member 7 so as to define a first almost closed space 12 by the first elastic member 8, the display panel 1 and the housing member 7, and
a second elastic member 11 disposed at a position surrounding a display area of the display panel between the display panel 1 and the face plate 9 so as to define a second almost closed space 13 by the second elastic member 11, the display panel 1 and the face plate 9.

According to another embodiment, the display apparatus includes: a display panel a housing member disposed behind and with a spacing from the display panel, a panel-fixing member fixedly supporting the display panel to the housing member, and a face plate having a transparent region disposed in front of the display panel; and the display apparatus further includes:
a first elastic member disposed at a position surrounding a display region of the display panel between the display panel and the panel-fixing member,
a second elastic member disposed at a position surrounding a display area of the display panel between the display panel and the face plate, and
a third elastic member disposed between the panel-fixing member and the housing member so that
a first almost closed space is defined by the first elastic member, the third elastic member, the display panel and the housing member, and
a second almost closed space is defined by the second elastic member, the display panel and the face plate.

According to another embodiment of the present invention, a fourth elastic member is disposed between the peripheral part of the panel-fixing member and the housing member.

In the above, it is preferred that the first elastic member 8 has a larger size in a direction perpendicular than in a direction parallel, respectively, with respect to the extension of the display panel 1. The first elastic member may preferably have a rubber hardness of at most 50 deg. The face plate 9 may have a transparent region composed of a chemically reinforced glass or comprise a transparent substrate having two surfaces on which an optical film subjected to a diffusion treatment has been applied with an adhesive. The housing member may be constituted by a backlight for illuminating the display panel. The second elastic member may have a hardness which is smaller than or equal to that of the first elastic member. The third elastic member may have a hardness which is smaller than or equal to that of the first elastic member. The second elastic member may be disposed under compression in a direction perpendicular to the display panel surface. The third elastic member may be disposed under compression in a direction perpendicular to the display panel surface. A circuit substrate for driving the display panel may be disposed on the panel-fixing member and a regulating member for regulating a movement in a direction perpendicular to the panel-fixing member.

The present invention may exhibit a remarkable effect when applied to a liquid crystal display apparatus, particularly one using a chiral smectic liquid crystal as an optical modulation material.

As the display apparatus according to the present invention is constituted in the above-described manner, even if a strong impact is applied thereto, it is possible to obviate difficulties, such as deterioration of liquid crystal alignment characteristic, image quality deterioration, breakage of an electrical connection member and separation of a joining part, thereby providing a display apparatus having a high reliability.

Figure 2:
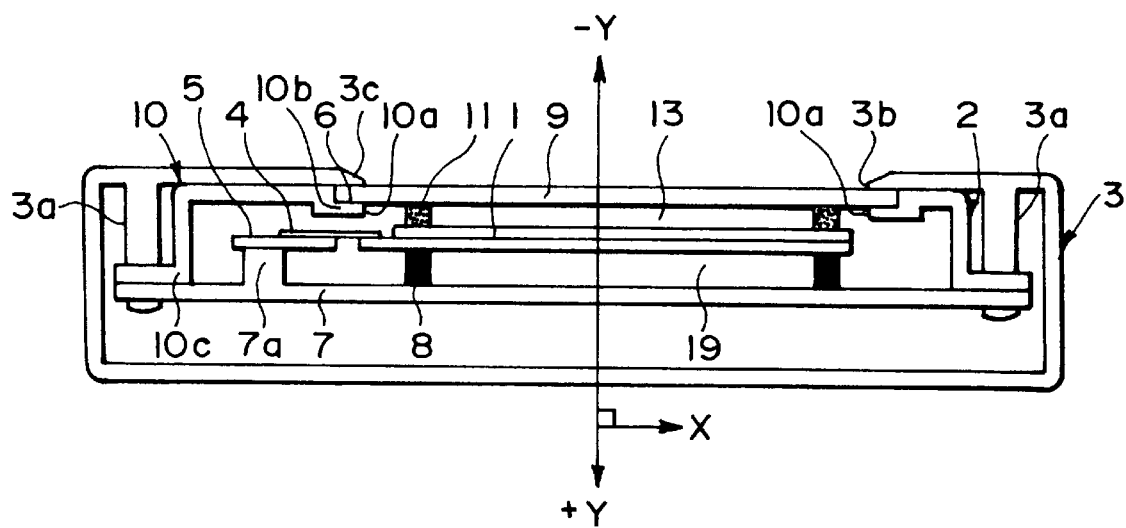

FIG. 2 shows a liquid crystal display apparatus according to another embodiment of the present invention, which includes a basic structure shown in FIG. 1.

Referring to FIG. 2, the liquid crystal display apparatus includes an inner unit 2 and an outer casing 3 supporting the inner unit 2. Of these, the outer casing 3 has an inner space and projecting members 3a projecting into the space. Further, the outer casing 3 has an upper surface member provided with an opening 3b.

On the other hand, the inner unit 2 includes a face plate-supporting member 10, which has an upper surface disposed along the outer casing 3 and has an opening 10a at a position corresponding to the opening 3b of the outer casing 3. The opening edge portion 10b of the face plate-supporting member 10 is bent so as to define a recess 6 together with the opening edge portion 3c of the outer casing 3, and a transparent face plate (first plate member) 9 is fitted into the recess 6 so as to be along the inner surface of the casing 3. Further, the lower edge portion 10c of the face plate-supporting member 10 is bent outwards to form a flange, along which a panel-fixing plate (second plate member) 7 is disposed. The panel-fixing plate 7 and the face plate-supporting member 10 are screwed to the projecting members 3a of the outer casing 3. The face plate 9 and the panel-fixing plate 7 are disposed with a prescribed spacing therebetween, in which a liquid crystal panel 1 is disposed. The liquid crystal panel 1 comprises a pair of oppositely disposed glass plates having electrodes on their opposing surfaces and a liquid crystal disposed between the pair of glass plates. A pair of polarizing films (not shown) are applied onto both surfaces of the liquid crystal panel 1, so as to function as polarizers. Between the face plate 9 and the liquid crystal panel 1, an elastic member 11 is disposed so as to surround the display region of the liquid crystal panel 1 and define a closed space 13 by the liquid crystal panel 1, the face plate 9 and the elastic member 11. On the other hand, between the panel-fixing plate 7 and the liquid crystal panel 1, an elastic member 8 is disposed so as to surround the display region of the liquid crystal panel 1 and define a closed space 19 by the liquid crystal panel 1, the panel-fixing plate 7 and the elastic member 8. Further, to the liquid crystal panel 1 is connected a TAB film 4 which is a flexible print circuit film having a drive IC thereon. The TAB film 4 is further connected to a peripheral circuit board (hereinafter called "driver board") 5 for the drive IC. The driver board 5 is fixed to a projecting portion 7a of the panel-fixing plate 7. Further, onto the lower surface of the panel-fixing plate 7, a panel control board (not shown) is fixed and connected to the liquid crystal panel 1 via cables (not shown) and the driver board 5 by mean of screws and pressing metals.

When an acceleration accompanying an impact acts in a +Y direction as shown, the liquid crystal panel 1 is caused to move in the direction. However, as the closed space functions as an air damper and because of the elasticity of the elastic member 8, the movement and deformation of the liquid crystal panel 1 are suppressed, thereby to prevent the deterioration of the alignment characteristic and image quality of the liquid crystal panel 1.

Figure 3:
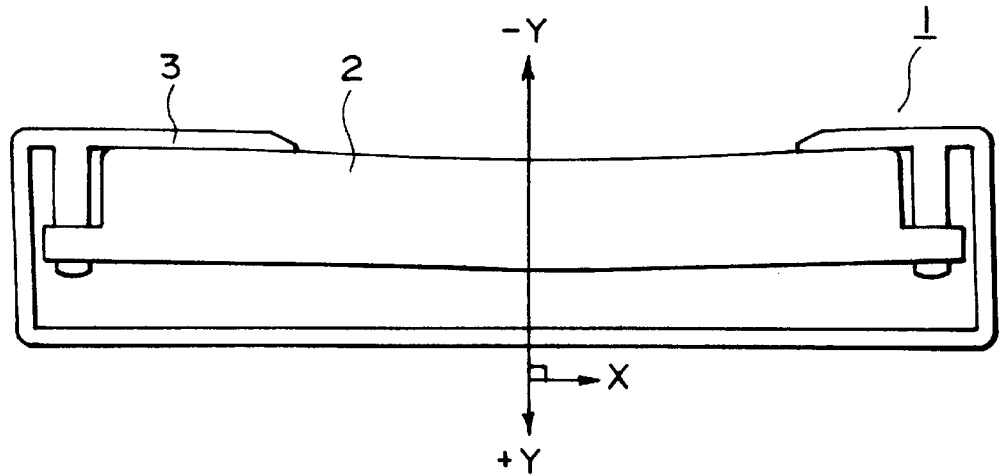
FIG. 3 illustrates a manner of deformation of the display apparatus shown in FIG. 2.

On the other hand, in case where an acceleration accompanying an impact acts in a −Y direction shown in FIG. 3, because of the function of the closed space 13 as an air damper and the elasticity of the elastic member 11, the movement of the liquid crystal panel 1 in the direction is suppressed to show a similar effect.

However, in case where the panel size (diagonal picture area size) is enlarged to 17 inches or larger and the acceleration caused by an impact is too large, the internal unit 2 per se is deformed as shown in FIG. 3, and accordingly the panel-fixing plate and the liquid crystal panel 1 are deformed, thus being liable to deteriorate the alignment characteristic and image quality of the liquid crystal panel 1.

Therefore, according to another embodiment of the present invention, there is provided a display apparatus including an outer casing member 3 having an inner space, a first plate member 9 disposed along an inner surface of the outer casing member 3, a second plate member 7 disposed with a prescribed spacing from the first plate member 9, a liquid crystal panel 1 disposed between the plate members 7 and 9, an elastic member 11 disposed between the first plate member 9 and the liquid crystal panel 1, and an elastic member 8 disposed between the second plate member 7 and the liquid crystal panel 1; wherein a support member (e.g., a member 18a in FIG. 16) is disposed at a spacing between the second plate member 7 and the outer casing 3. In this instance, the support member can be fixed to either the second plate member or the outer casing member. It is preferred that the support member is fixed to both the second plate member and the outer casing member. It is further possible to dispose a third plate member between the second plate member and the liquid crystal panel and dispose elastic members, respectively, between the liquid crystal panel and the third plate member, and between the third plate member and the second plate member. In this instance, it is preferred that the third plate member is fixed to the outer casing member via an elastic member. Further, the second plate member can be constituted as a backlight device. The second plate member can also be constituted as a side light-type backlight device comprising a light guide member and light sources disposed to surround or sandwich the light guide member. The liquid crystal panel may comprise a pair of opposing substrates having electrodes on their opposing surfaces and a liquid crystal disposed between the substrates. The liquid crystal may be a chiral smectic liquid crystal.

Based on the above structure, even if a liquid crystal apparatus is supplied with a strong impact so as to cause the second plate member to move closer to the outer casing member, the movement is suppressed by a support member disposed between the second plate member and the outer casing member, and the deformation of the second plate member is also suppressed. As a result, the movement and deformation of the liquid crystal panel supported by the second plate member via an elastic member are also reduced.

Figure 4:
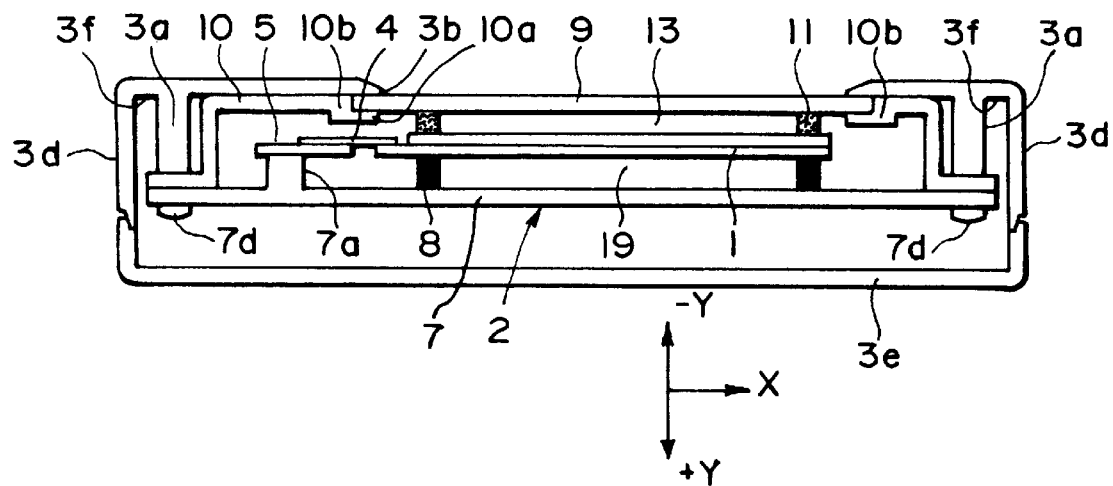

Several embodiments of liquid crystal display apparatus may be disclosed including one shown in FIG. 4.

Referring to FIG. 4, a liquid crystal display apparatus includes openably or separably structured upper and lower housings 3d and 3e (hereinafter called "upper housing" and "lower housing"), of which the upper housing 3d is provided with an opening 3b. Further, the inner surface 3f of the upper housing 3d is provided with a boss 3a, to which an inner unit 2 is fixed by a screw 7d.

The inner unit 2 includes a panel-fixing plate (second member) 7 having a projection 7a. The inner unit 2 also includes a face plate-supporting member 10 having edges fixed to the panel-fixing plate 7 by screws, etc. (not shown), and the other portion of the face plate-supporting member 10 is separated from the panel-fixing plate 7 to form a space together with the panel-fixing plate 7. The face plate-supporting member 10 is further provided with an opening 10a in a region corresponding to the opening 3b of the upper housing. The edge portion 10b surrounding the opening 10a is bent downwards along the entire periphery of the opening. A transparent face plate (first member) 9 is fitted into the resultant recess of the edge portion 10b to close the opening 10a.

A liquid crystal panel 1 is disposed between the panel-fixing plate 7 and the face plate 9. The liquid crystal panel 1 comprises a pair of glass substrates disposed in parallel and having electrodes on their inner surfaces. A liquid crystal is disposed between the substrates. Polarizing films are applied on both surfaces of the liquid crystal panel 1. Between the liquid crystal panel 1 and the face plate 9, an elastic member (second elastic member) is disposed so as to surround a display region of the liquid crystal panel 1. Between the liquid crystal panel 1 and the panel-fixing plate 7, an elastic member (third elastic member) 8 is disposed so as to surround a display region of the liquid crystal panel 1. The elastic member 11, the liquid crystal panel 1, and the face plate 9 define an almost closed space 13. The liquid crystal panel 1, the panel-fixing plate 7 and the elastic member 8 define an almost closed space 19. The face plate 9 and the opening 3b of the housing are disposed in alignment with the display region of the liquid crystal panel 1. To the liquid crystal panel 1 are connected a TAB film 4 comprising a flexible print circuit film having a drive IC thereon and a driver board 5 as a peripheral circuit substrate for the drive IC. The driver board 5 is connected to a control board (not shown) via a flexible cable, so that drive signals are supplied from the control board to the liquid crystal panel 1. The driver board 5 is affixed to the protrusions 7a by means of screws and holding metal members (not shown).

When such a liquid crystal display apparatus is dropped in a +Y direction in FIG. 4 to impinge on a ground (not shown), the panel is caused to be deformed in the direction. However, as an elastic member 18 is disposed between the liquid crystal panel 1 and the panel-fixing plate 7, and the almost closed spaces 13 and 19 function as air dampers, the deformation of the liquid crystal panel 1 is suppressed to well retain the alignment characteristic and the image quality of the liquid crystal panel 1.

Further, even in the case where an impact is applied in a −Y direction in FIG. 4, the deformation of the liquid crystal panel in the direction is suppressed by the function of the elastic member 11 and the almost closed spaces 13 and 19.

Figure 5:
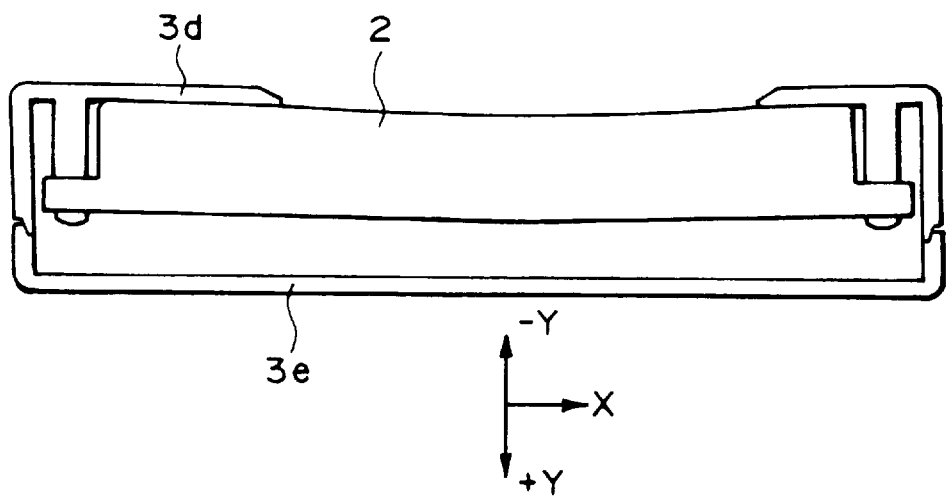
FIG. 5 illustrates a manner of deformation of the display apparatus shown in FIG. 4.

The periphery of the inner unit 2 is however tightly fixed to the upper housing 3d. Accordingly, in case where the upper housing 3d is deformed by dropping of the liquid crystal display apparatus, the flexural moment thereof is transmitted to the inner unit 2 per se, so that the inner unit 2 including the panel-fixing member 7 and the face plate-supporting member 10 is liable to be deformed as shown in FIG. 5. If the inner unit 2 is deformed, the liquid crystal panel 1 is also deformed to result in inferior alignment state and image quality thereof. This problem becomes noticeable in case where the liquid crystal panel is provided with a larger display area.

In an embodiment of the present invention, a liquid crystal apparatus is constituted to include an inner unit 2 including a liquid crystal device 1 and a housing 3 to which the inner unit 2 is affixed. The apparatus further includes a first elastic member between the inner unit 2 and the housing 3 so that a flexural moment caused by the deformation of the housing is prevented from being transmitted to the inner unit. In this case, it is preferred that the inner unit is screwed to the housing, and the first elastic member is disposed between the inner unit 2 and the housing at the part of the screw connection.

In this instance, the inner unit includes first and second members disposed with a prescribed spacing therebetween, a liquid crystal device disposed between the first and second members, a second elastic member disposed between the first member and the liquid crystal device, a third elastic member disposed between the second member and the liquid crystal device, so as to define an almost closed space by the liquid crystal device, first member and second elastic member and define an almost closed space by the liquid crystal device, second member and third elastic member.

It is also possible to dispose a third member between the second member and the liquid crystal device and dispose third elastic members respectively between the third member and the liquid crystal device and between the third member and the second member so as to define almost closed spaces by the third member, and a third elastic member together with the liquid crystal device and the second member, respectively.

It is also possible that the third member is provided with an opening and the liquid crystal device is affixed to the third member so as to close the opening and so that the opening is aligned with the image region of the liquid crystal device. In this instance, the third member may include a panel-fixing part to which the liquid crystal device is affixed, an affixing part to be affixed to the second member and an elastic part disposed between the panel-fixing part and the affixing part.

The second member may be provided as a plate member. Alternatively, the second member may be provided as a backlight device disposed so as to illuminate the liquid crystal device. In this instance, the second member may comprise a transparent light guide member and a light source disposed in proximity to the light guide member. The light guide member may comprise an acrylic plate. The light guide member may have a surface opposite to the liquid crystal device provided with a light-diffusing means, e.g., applied thereto. It is also possible to dispose a light-diffusing means at the opening of the third member.

On the other hand, the first member may comprise a transparent plate member so that the displayed image on the liquid crystal device can be observed through the first member.

The first elastic member may comprise rubber. Further, the second and third elastic members may comprise rubber.

The liquid crystal device may comprise a pair of substrates having thereon electrodes and a liquid crystal disposed between the substrates. The liquid crystal device may be connected with a drive IC for driving the liquid crystal device, and a peripheral circuit board for driving the drive IC. The liquid crystal may be a chiral smectic liquid crystal showing ferroelectricity.

Based on the above-described structure, even if the liquid crystal apparatus is dropped to deform the housing thereof, the flexural moment caused by the deformation is prevented from being transmitted to the inner unit.

The display panel used in the present invention may comprise a plasma device, an electrochromic device, a liquid crystal device, a digital micro-mirror device (OMD), etc. Among these, the liquid crystal device may preferably be one using a nematic liquid crystal or a smectic liquid crystal as an optical modulation material disposed between a pair of substrates. In the present invention, it is particularly preferred to use a liquid crystal device including a pair of substrates, between which a multiplicity of adhesive beads or pieces of a curable resin are dispersed and cured so as to retain a constant layer thickness of the liquid crystal and prevent the liquid crystal molecular alignment disorder by bonding the pair of substrates. The cured adhesive beads or pieces in the shape of small cylindrical pillars or square pillars of 1–10 $\mu$m in diameter do not adversely affect the display quality. In combination with such adhesive pieces, it is preferred to use a non-adhesive spacer in a particulate or stripe form in combination.

Such a panel structure may be found, e.g., in U.S. Pat. Nos. 4,740,060 and 4,989,955.

If the adhesive and a sealant for sealing the periphery of the pair of substrates are both composed of a curable epoxy resin-based material, the pair of substrates may be bonded to each other with a constant gap therebetween through a common step for curing the adhesive and the sealant by heat-application or photo-irradiation.

Thus, in the present invention, by retaining a constant gap between the substrates by a cured resin in the display panel, and externally supporting the display panel with an elastic member, an alignment or a stability in the display panel is better retained.

The elastic members used in the present invention may preferably comprise a natural or synthetic resin or elastomer, examples of which may include silicone rubber, polyester-type foam rubber, butyral rubber, elastomeric adhesives.

The elastic members may preferably be disposed outside the effective display region of the display panel. Colored elastic materials can be disposed at a transparent portion of the face plate to be also used as a masking material.

The elastic members may preferably be disposed continuously or discretely so as to surround outer four sides (outer periphery) of the effective display area but may be disposed at at least two laterally or vertically symmetrical parts without causing a practical problem.

The support means for supporting the display panel used in the present invention may preferably be formed of a non-elastomeric material, examples of which may include plastics, metals, glass and ceramics.

As the display apparatus according to the present invention is provided with an improved impact-resistant structure, the display quality is not impaired even if a pen-input means, such as a digitizer or a touch panel, is provided on the face plate. Further, as the face plate can be disposed closer to and in parallel with the display panel, an accurate input becomes possible.

The present invention will be further discussed with respect to more specific embodiments shown in the drawings.

[First embodiment]

Figure 6:
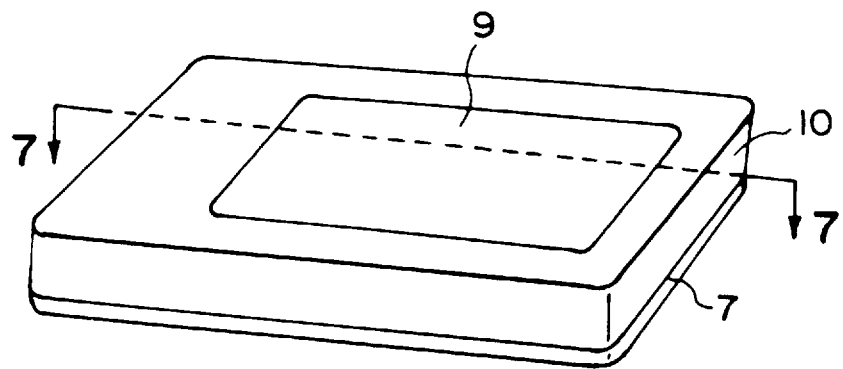
FIG. 6 is a schematic perspective view of a display apparatus of first embodiment.
Figure 7:
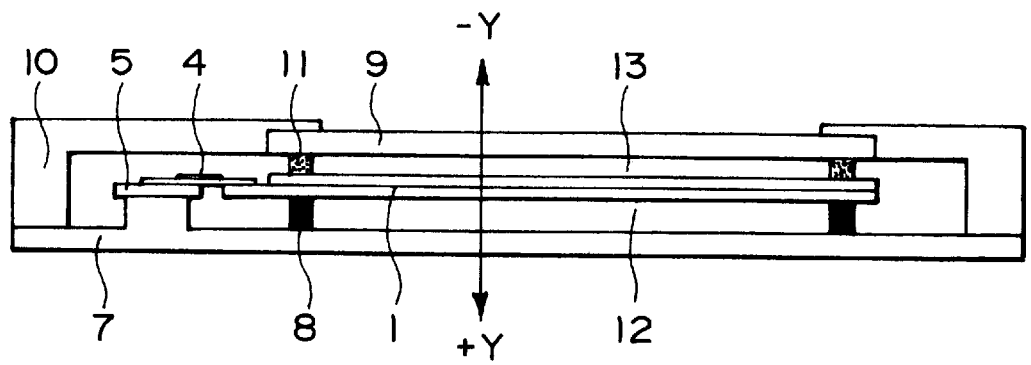
FIG. 7 is a sectional view of the display apparatus shown in FIG. 1.

FIG. 6 is a perspective view of a liquid crystal display apparatus according to an embodiment of the present invention, and FIG. 7 is a sectional view taken along a line 7—7' in FIG. 6.

Referring to FIG. 7, a liquid crystal panel 1 is constituted by a pair of opposing glass substrates each having electrodes thereon and a (ferroelectric) chiral smectic liquid crystal disposed between the glass substrates. The liquid crystal panel 1 is provided with a polarizing film functioning, as a polarizer applied onto each of the upper and lower surfaces thereof. The polarizing films are however not directly related with the gist of the present invention, so that they have been omitted from the figures for the sake of brevity. The liquid crystal panel 1 is connected to a driver IC comprising a TAB film carrying an IC chip and a driver board 5 for supplying signal electricity to the driver IC.

The liquid crystal panel 1 is fixedly disposed on a first elastic member 8 which is disposed on an upper surface of an apparatus housing member 7 so that the first elastic member 8 surrounds the display area of the liquid crystal panel 1. This structure may be formed by applying a rubber-type adhesive of (e.g., silicone rubber) assuming elastomeric property after curing in the form of a frame onto the upper surface of the housing member 7, and placing the liquid crystal panel 1 thereon, followed by curing.

Above liquid crystal panel 1, a face plate 9 is disposed by fixing it to a face plate-supporting member 10, which in turn is fixed to the housing member 7.

Between the face plate 9 and the liquid crystal panel 1, a second elastic member 11 is disposed so as to surround the display area of the liquid crystal panel 1 similarly as the first elastic member 8. As a result, an almost closed space 12 is defined by the housing member 7, the liquid crystal panel 1 and the first elastic member 8, and an almost closed space 13 is defined by the face plate 9, the liquid crystal panel 1 and the second elastic member 11.

The function of the liquid crystal display apparatus when an impact is applied to the liquid crystal panel 1, e.g., by dropping of the display apparatus, will now be described.

In the case of dropping in a +Y direction, the liquid crystal panel 1 is supplied with a load by the impact of the dropping, whereby the liquid crystal panel 1 is moved in the +Y direction in FIG. 7. At this time, owing to the air damper effect of the space 12 below the liquid crystal panel 1 and the elasticity of the elastic member 8, the deformation of the liquid crystal panel 1 is suppressed to a low level, whereby the deterioration of the alignment characteristic and image quality of the liquid crystal panel 1.

Figure 28A:
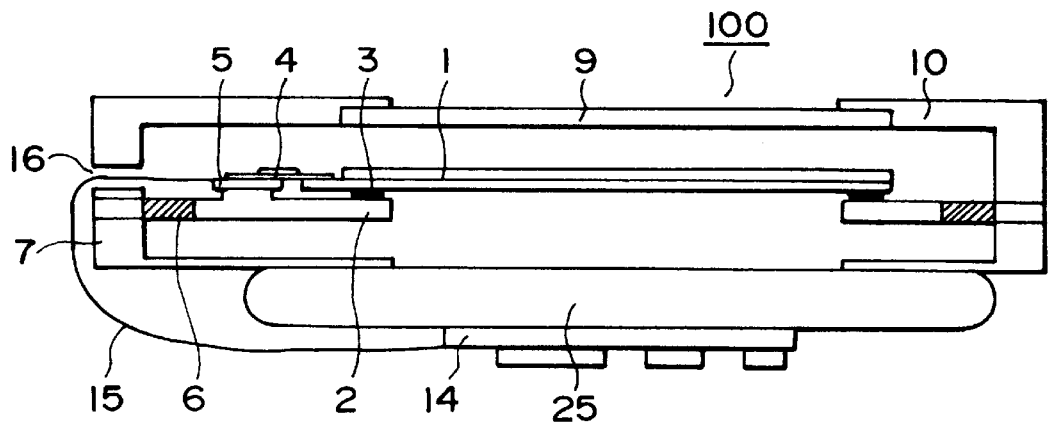
FIGS. 28A and 28B are schematic views of a known display apparatus in a stationary sate and in a state supplied with an impact.
Figure 28B:
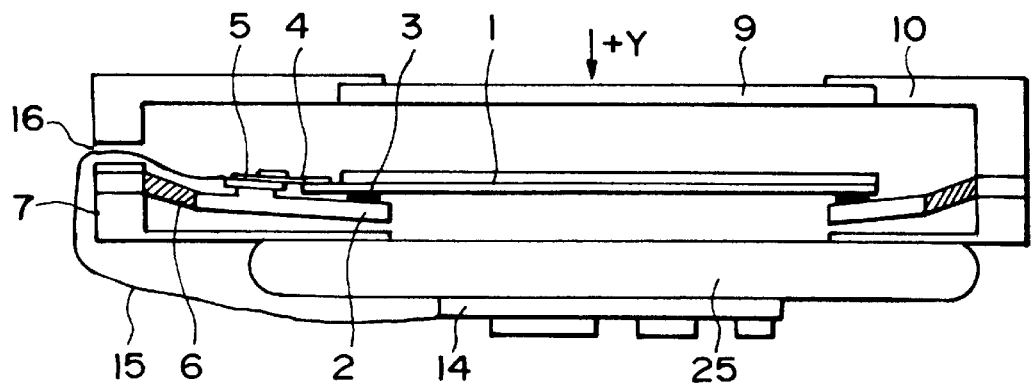

Also in the case of dropping in a −Y direction, owing to the air damper effect of the space 13 above the liquid crystal panel 1 and the elasticity of the elastic member 11, effects similar to those in the case of the movement in the +Y direction are attained. In the hitherto proposed apparatus (shown in FIG. 28A), the housing member 7 or the face plate-supporting member 10 is provided with a hole 16 for passing a cable 15 connecting the driver board 5 and the panel control board 14, the air-tightness of the space above the liquid crystal panel 1 has been low, whereas the air damper effect is improved by disposing the second elastic member 11 at a position shown in the FIG. 7 to provide a higher air-tightness.

[Second embodiment]

Figure 8:
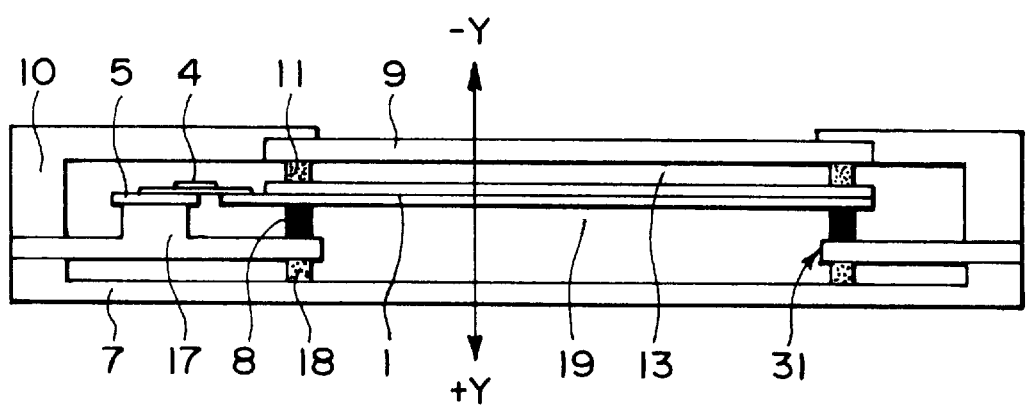

FIG. 8 shows an embodiment providing an improvement in First embodiment. As shown in FIG. 8, a liquid crystal panel 1 is fixed to a panel-fixing member 17 via a first elastic member 8 as described above, and the panel-fixing plate 17 is fixed to a housing member 7. The panel-fixing plate 17 is provided with an opening 31 in a region corresponding to the display area of the liquid crystal panel 1. Further, a third elastic member 18 is disposed between the panel-fixing plate 17 and the housing member 7 at a position symmetrical to the first elastic member 8 with respect to the panel-fixing plate 17, whereby an almost closed space 19 is defined by the liquid crystal panel 1, the first elastic member 8, the panel-fixing plate 17, the third elastic member 18 and the housing member 7.

As a result, an improved effect of relaxing the impact to the liquid crystal panel 1 by utilizing not only the air damper effect of the space 19 but also the elasticity at the time of deformation of the panel-fixing plate 17 and the third elastic member 18.

[Third embodiment]

In the structure shown in FIG. 8, the elasticity at the time of deformation of the panel-fixing plate 17 is also utilized for impact alleviation. However, in case where the deformation of the panel-fixing plate 17 is too large, it is liable to cause a problem that the liquid crystal panel 1 is also deformed accompanying the panel-fixing plate 17.

Figure 9:
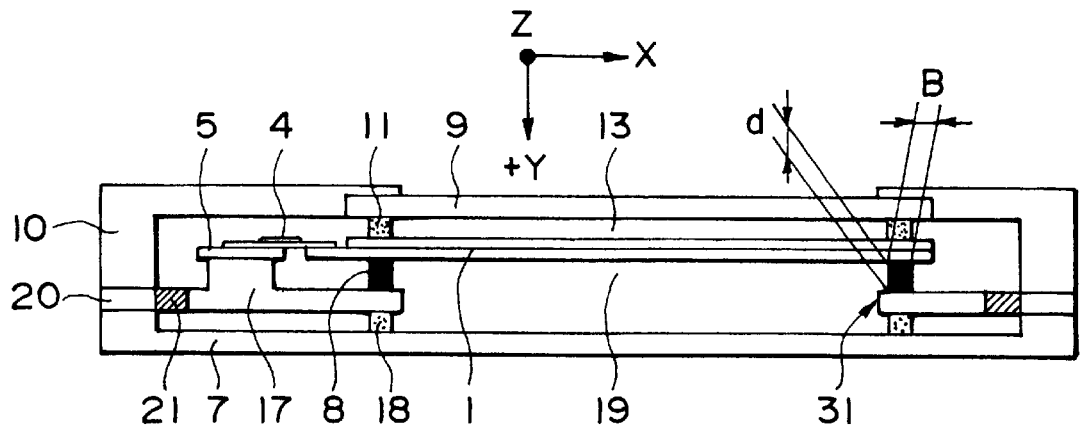

Therefore, as shown in FIG. 9, a fourth elastic member 21 is disposed between a peripheral edge of the panel-fixing plate 17 and the opening inner surface of a fixing plate-supporting member 20, so the panel-fixing plate 17 is hung in space via the fourth elastic member 21 by the fixing plate-supporting member 20. This structure may be formed by filling a gap between the peripheral edge of the panel-fixing plate 17 and the opening inner surface of the fixing plate-supporting member 20 with a rubber adhesive, followed by curing thereof by standing for a relatively long time. Then, the fixing plate-supporting member 20 is fixed between the housing member 7 and the face plate-supporting member 10.

According to Third embodiment described above, the deformation of the panel-fixing plate 17 is suppressed due to deformation of the fourth elastic member 21. As a result, the effect of impact relaxation on the liquid crystal panel 1 is retained by the third elastic member 18 and the fourth elastic member 21 while suppressing the deformation of the panel-fixing plate 17.

On the other hand, in the hitherto proposed structure, such an elastic member 21 has to be sufficiently deformed in oder to obtain a relaxation effect. Accordingly, a large spacing has to be provided between the face plate 9 and the housing member 7, so as to prevent the panel-fixing plate 17 from contacting the face plate 9 and the housing member 7.

In the structure of FIG. 9, however, the deformation of the fourth elastic member 21 may be set to a smaller degree by adding the first elastic member 8, the second elastic member 11 and the third elastic member 18, so that the face plate 9 and the housing member 7 may be disposed closer to the panel-fixing plate 17, i.e., to the liquid crystal panel 1. As a result, the parallax between the face plate 9 and the liquid crystal panel 1 and the fading of the display can be suppressed, and the thickness of the entire liquid crystal display apparatus can be reduced.

Further, in the structure shown in FIG. 9, by adding the first to third elastic members 8, 11 and 18, the width of the fourth elastic member (i.e., the gap between the edge face of the panel-fixing plate 17 and the inner surface of the fixing plate-supporting member 20) can be reduced than the conventionally set value (width of the elastic member 6 in FIG. 28A), whereby the marginal area size (the area outside the display area) of the liquid crystal display apparatus can be substantially reduced.

The first elastic member 8 may preferably have a cross sectional shape defined by a thickness (i.e., a gap between the lower surface of the liquid crystal panel 1 and the upper surface of the panel-fixing plate 17) d and a lateral (or radial) width (i.e., a minimum size in a direction parallel to the liquid crystal panel 1) B satisfying $d \geq B$. Such a sectional shape may be given by applying a rubber adhesive twice in superposition. The rubber adhesive preferably used may have a rubber hardness of at most 50 deg. after the curing.

Figure 10:
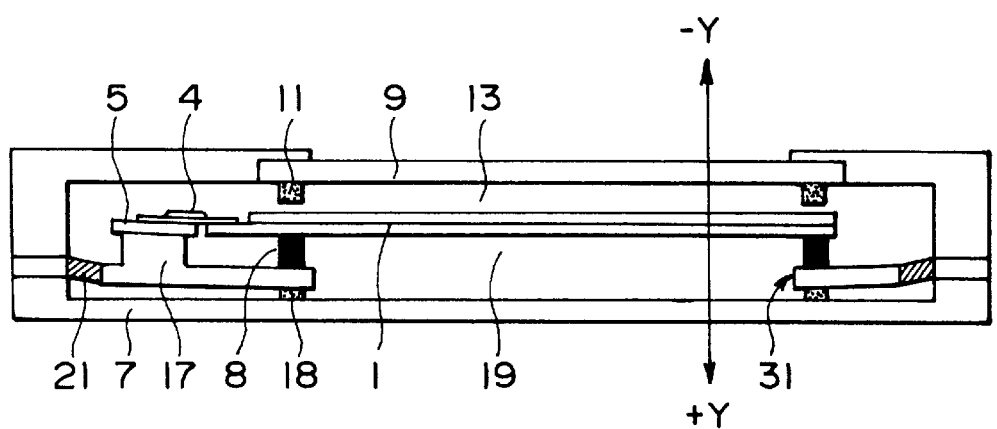

The above-mentioned sectional shape of the material condition (rubber hardness) may be preferred for reasons, which will be explained below with reference to FIGS. 10 and 11.

The mechanism for the suppressed deformation of the panel-fixing plate 7 is as described above, i.e., the elasticity of the third elastic member 18 disposed below the panel-fixing plate 17 and the air damper effect of the spaces 13 and 19 in the case of dropping in the +Y direction, and the elasticity of the second elastic member disposed above the panel-fixing plate 17 and the air damper effect of the spaces 13 and 19 in the case of dropping in the −Y direction. Further, by providing the first elastic member with the above-mentioned sectional shape and a rubber hardness of at most 50 deg., the first elastic member 8 can be easily deformable in response to a deformation stress applied to the panel-fixing plate 17. This leads to a reduced transmission of the deformation of the panel-fixing plate 17 to the liquid crystal panel 1, thereby providing a further improved impact relaxation effect.

In a specific example of combination, the first elastic member was formed of silicone rubber having a rubber hardness of 35 deg. in a sectional shape of B=1.5 mm and d=2.5±0.5 mm.

The second elastic member 11 and the third elastic member 11 may preferably comprise a rubber, such as polyester-type foam rubber, having a lower rubber hardness than the rubber constituting the first elastic member 8, such as silicone rubber.

Further, the second elastic member 11 and the third elastic member 18 may be fixed in a compressed state, respectively, between the face plate 9 and the liquid crystal panel 1 and between the panel-fixing plate 17 and the housing member 7.

In the structures of FIGS. 7–9, the face plate 9 may comprise chemically reinforced glass sheet subjected to a non-glare film onto a glass sheet. An ordinary glass sheet is more fragile than a chemically reinforced glass sheet, so that the use thereof as a face plate 9 is difficult from the view point of safety. However, if a film is applied thereon, the scattering of fragments is prevented, so that an ordinary glass sheet may be sufficiently used.

[Fourth embodiment]

In this embodiment, the above-described embodiments are improved with respect to the manner or structure of supporting the driver board 5 onto the housing member 7 or the panel-fixing plate 17. FIGS. 12, 13 and 14 illustrate an embodiment wherein a driver board 5 is supported by a panel-fixing plate 17. (Incidentally, in FIGS. 13 and 14, an upper structure including a face plate 9 and a face plate-supporting member has been omitted from showing for convenience of illustration.) The driver board 5 is sandwiched or held by a supporting rib 22 formed on the upper surface of the panel-fixing plate 17, a driver board-holding elastic member (hereinafter called a holding elastic member) 23 and a metal member (hereinafter called a holding metal) 24 affixed onto the upper surface of the panel-fixing plate 17.

In this instance, the distance between the upper surface of the rib 22 and the lower surface of the holding elastic member 23, and the distance between the upper surface of the rib 22 and the lower surface of the holding metal 24, are respectively set to be larger than the thickness of the driver board 5, so that a gap is always left between the driver board 5 and the holding metal 24.

As a result, the driver board 5 can be moved freely in the ±X and Z directions but the movement thereof is lightly constrained in the ±Y directions. As described above, since the first elastic member 8 is provided with a sectional shape of $d \geq B$, the liquid crystal panel 1 can be moved in a larger degree in any of the ±X, Y and Z-directions. As a result, some concern may arise that a load is applied at electrical connections between the liquid crystal panel 1 and the TAB film 4, and between the TAB film 4 and the driver board 5. However, as shown in FIGS. 12 and 13, the movement of the driver board 5 is free in the ±X and Z-directions and lightly constrained in the ±Y directions and the gas between the driver board 5 and the holding metal 24 is set to be smaller than the degree of movement of the liquid crystal panel 1 in the ±X and Z-directions, so that no load is applied.

[Fifth embodiment]

In this embodiment, as shown in FIG. 15, a backlight unit 25 is disposed in place of the housing member 7 so as to form almost closed spaces 19 and 19a below a liquid crystal panel 1. The backlight unit 25 includes a backlight-supporting member 26 and a lighting unit 27 fixed to the lower side thereof. The lighting unit 27 has a side light-structure including tubular light sources 8 (e.g., of hot cathode lamps) each disposed on a side thereof, a transparent acrylic plate 29 as a light-guide member superposed with a diffusive sheet (not shown) for providing scattered diffusive light at the center and a reflecting member 30 covering the circumference of the tubular light sources 28.

It is also possible that the diffusive sheet or a diffusive plate member 32 is disposed and fixed so as to close the opening of the panel-fixing plate 17. In this instance, upper and lower almost closed spaces 19 and 19a may be formed in separation, but both spaces retain an almost closed state, so that the air damper effect is not impaired.

The above-respective embodiments have been described as using a ferroelectric liquid crystal because the liquid crystal is liable to cause an alignment deterioration when supplied with an impact, but the respective structures can be effectively applied to a liquid crystal panel-supporting structure using other liquid crystal materials (e.g., a nematic liquid crystal). In this way, the effectiveness of the above-described structures does not depend on the kinds of liquid crystal materials.

A silicone rubber adhesive has been described as constituting the first elastic member 8 between the liquid crystal panel 1 and the panel-fixing plate by bonding these members therewith, but other adhesive materials may be used similarly if a similar rubber hardness can be given thereby.

Further, a similar effect can be attained by using a frame-shaped elastic material prepared, e.g., by stamping from a larger size formed sheet and fixing the elastic member, e.g., by using a double-coated adhesive tape. Such a frame-shaped elastic member may be composed of a variety of materials and prepared and fixed in other manners than described above.

As described above, the housing member 7 can be replaced by a backlight unit 25, which however can be an of a direct backing type, a side light-type using a solid light-guide member (as described) and a side light-type using a hollow light-guide member, by retaining a similar effect. Thus, the present invention does not depend on the type of the backlight unit.

As described above, according to First to Fifth embodiments of the present invention, the deformation of a liquid crystal panel when subjected to a dropping impact is suppressed owing to the air damper effect of a space and the elasticity of the first elastic member, thereby preventing the deterioration of alignment characteristic and image quality of the liquid crystal panel.

Further, as a third elastic member is disposed between the panel-fixing plate and the apparatus housing member, it becomes possible to utilize the elasticity thereof at the time of deformation, thereby improving the effect of relaxing the impact to the liquid crystal panel.

Further, by supporting the panel-fixing plate in a hang-in-space state via a fourth elastic member disposed to surround it to the fixing plate-supporting member, the impact relaxation effect for the liquid crystal panel is retained due to the elasticity of the third and fourth elastic members while suppressing the deformation of the panel-fixing plate due to deformation of the fourth elastic member.

Further, by specifying the sectional shape and the rubber hardness of the first elastic member, the first elastic member is allowed to be deformed easily so that the deformation of the panel-fixing plate at the time of dropping is well prevented from being transmitted to the liquid crystal panel. By adding these structural modifications, it is possible to attain a further improved dropping impact relaxation effect.

Further, by adding the first to third elastic members, the deformation of the fourth elastic member can be reduced, so that the face plate and the housing member can be disposed closer to the panel-fixing plate, i.e., to the liquid crystal panel. As a result, the parallax between the face plate and the liquid crystal panel can be reduced, the fading of display can be alleviated and the thickness of the entire liquid crystal display apparatus can be reduced to allow a compact apparatus.

Further, by adding the first to third elastic members, the width of the freely-deformable fourth elastic member can be reduced compared with a corresponding elastic member in a known apparatus, so that it is possible to reduce the marginal frame size surrounding the display area of the liquid crystal display apparatus.

[Sixth embodiment]

Referring to FIG. 16, a liquid crystal apparatus according to this embodiment includes a support member 18a disposed between a lower casing member 3e and a panel-fixing plate (second plate member) 7. The support member 18 is fixed to the panel-fixing plate 17 with its upper surface, and the lower surface thereof is abutted and fixed to the upper surface of the lower casing member 3e. The support member 18a is generally in the form of a pillar.

On the other hand, elastic members 11 and 8 are formed from a rubber type adhesive 9 (of, e.g., silicone rubber) capable of retaining elasticity even after the curing. More specifically, the elastic members may be formed by applying such an adhesive in the form of a frame onto the surfaces of a face plate (first state member) 9, the liquid crystal panel 1 or the panel-fixing plate 7, and then applying these members to each other.

In this embodiment, the outer casing 3 is composed of an upper casing member 3d and the lower casing member 3e, and the lower casing member 3e is disposed releasably as desired.

The liquid crystal apparatus according to this embodiment functions as follows.

When the liquid crystal apparatus is dropped onto a floor, etc., to receive a large impact in a +Y direction, an inner unit 2 including the panel-fixing plate 7 is caused to move by inertia in the +Y direction, but the inner unit 2 is fixedly supported by the lower casing member 3e via the support member 18a, whereby the movement is prevented. As a result, the deformation of the liquid crystal panel 1 accompanying the movement and deformation of the inner unit 2 is prevented, so that the deterioration of the alignment characteristic and the image quality is prevented. Further, the deformation of the upper casing member 3d is also prevented.

When a large impact is applied in a -Y direction, the movement of the inner unit 2 in the -Y direction is prevented by a pulling force exerted by the support member 18a, so that the movement and the deformation of the inner unit 2 are prevented.

As described above, according to this embodiment, even when a large impact is applied to the liquid crystal apparatus, the deformation of the liquid crystal panel 1 is suppressed, thereby to prevent the deterioration of the alignment characteristic and the image quality.

[Seventh embodiment]

In this embodiment shown in FIG. 17, a panel-fixing plate (third plate member) 17 is provided with an opening 17a in a region corresponding to the display area of the liquid crystal panel 1 and, below the panel-fixing plate 17, a fixing plate-supporting member (second plate member) 7 is disposed. The fixing plate-supporting member 7 is screwed to the upper casing 3d together with the panel-fixing plate 17 and the face plate-supporting member (first plate member)

10. Between the panel-fixing plate 17 and the fixing plate-supporting member 7, a frame-shaped elastic member 18 is disposed so as to surround the display area of the liquid crystal panel 1, whereby a closed space 19a is defined by the liquid crystal panel 1, the elastic members 8 and 18, the panel-fixing plate 17 and the fixing plate-supporting member 7.

At a spacing between the lower casing member 3e and the fixing plate-supporting member 7, a support member 18a is disposed. The upper surface of the support member is fixed to the lower surface of the fixing plate-supporting member 7, and the lower surface thereof is abutted and fixed to the upper surface of the lower casing member 3e.

According to this embodiment, the impact applied to the liquid crystal panel is alleviated by the elasticity of the panel-fixing plate 17 and the elastic member 18, the prevention of the deterioration of the alignment characteristic and the image quality are further ensured.

[Eighth embodiment]

In this embodiment shown in FIG. 18, a portion of the panel-fixing plate 40 is composed of an elastic member 21. More specifically, the panel-fixing plate 40 in this embodiment includes a frame-shaped base portion 20, a fixing portion 17 for supporting the liquid crystal panel 1 and the driver board 5, and the elastic member 21 connecting the base portion 20 and the fixing portion 17. Such a connecting structure may be formed by disposing the base portion (member) 20 and the fixing portion (member) 17 at positions as shown, and filling the spacing therebetween with a rubber adhesive to cure the adhesive. The other structures are similar to those shown in Seventh embodiment described above.

According to this embodiment, the fixing portion 17 of the panel-fixing plate 40 is supported via the elastic member 21, the deformation of the fixing portion 17 is alleviated. As a result, the deformation of the liquid crystal panel 1 accompanying the deformation of the fixing portion 17 is alleviated, to ensure the prevention of deterioration of the alignment characteristic and the image quality.

[Ninth embodiment]

Figure 19:
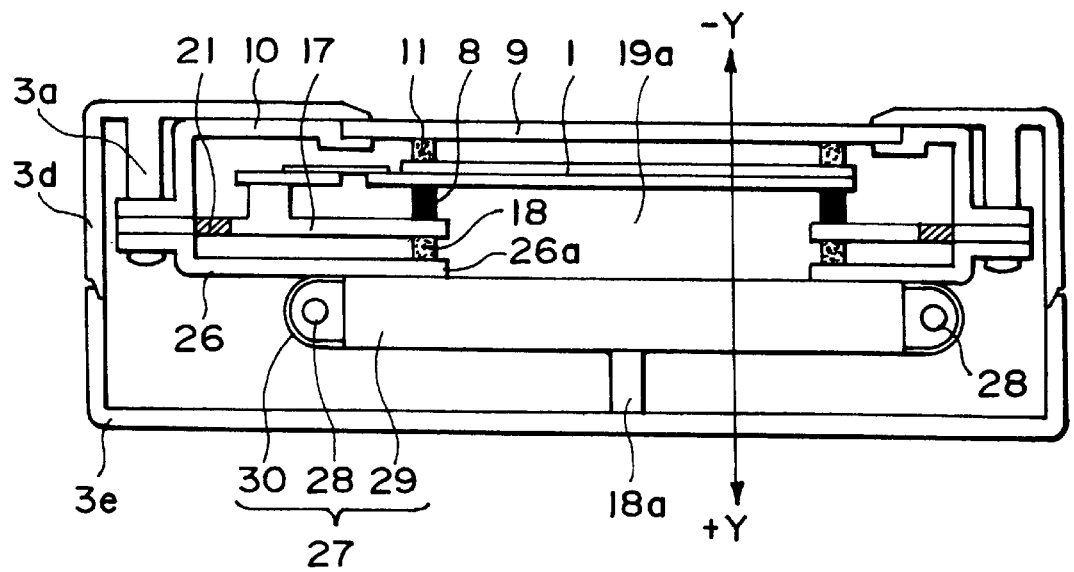

In this embodiment shown in FIG. 19, a backlight-supporting member 26 is disposed below a panel-fixing plate 17 (third plate member). The backlight-supporting member 26 is provided with an opening 26a in a region corresponding to the display area of the liquid crystal panel 1. Between the panel-fixing plate 17 and the backlight-supporting member 26, a frame-shaped elastic member 18 is disposed so as to surround the display area of the liquid crystal panel 1. Below the backlight-supporting member 26, a side-light type backlight device (second plate member) 27 is disposed. The backlight device 27 includes a transparent acrylic plate 29 as a light guide member, which is disposed in a region corresponding to the display area of the liquid crystal panel 1. Surrounding the light guide member 29, light sources including, e.g., cold cathode tubes or hot cathode tubes. Each light source is backed with a reflecting member 30. Further, a light-diffusive sheet (not shown) is disposed in superposition of the light guide member.

Figure 20:
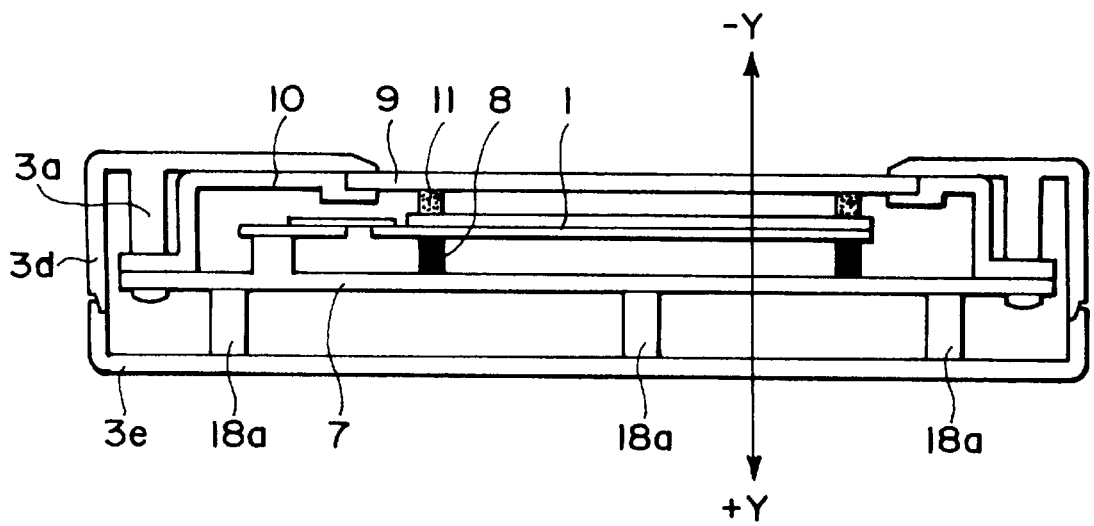
FIG. 20 is a sectional view illustrating another disposition of a support member.

In the above embodiments, the support member 18a is in the form of a pillar but can be a rib-shaped. A single support member 18a is used in the above, but a plurality of support members 18a can be used as shown in FIG. 20. Further, in the above embodiment, both the upper and lower surfaces of the support member 18a are fixed, but it is possible to fix only one of them.

The elastic member 11 can be formed from any other adhesive in place of the rubber adhesive (of, e.g., silicone rubber adhesive) used in the above, if it has a similar degree of hardness after the curing. The elastic member may also be formed by fixing a stamped frame-shaped elastic material with a double-coated tape.

The light guide member 29 need not be a transparent solid acrylic plate described above but can be a hollow light guide member. The backlight device need not be of the side light-type but can be a direct-backing type. The light-diffusive member (sheet in the above) need not be directly superposed with the light guide member 29 as described above. Instead thereof, e.g., a light diffusive plate member 60 may be disposed so as to close the opening 40a of the panel-fixing plate 17. In this instance, upper and lower closed spaces 19 and 19a are formed in separation, but both spaces retain an almost closed state, so that the air damper effect is retained.

The above embodiments have been described as using a liquid crystal panel 1 containing a ferroelectric liquid crystal, which however can be replaced by another liquid crystal material (such as nematic liquid crystal).

As described above, according to Sixth to Ninth embodiments, even when a liquid crystal apparatus is supplied to a large impact, the movement and deformation of the second plate member is prevented by the support member. As a result, the movement and deformation of the liquid crystal panel supported via an elastic member by the second plate member are also suppressed to prevent the deterioration of the alignment characteristic and image quality of the liquid crystal panel.

In case where the support member is fixed to either one of the second plate member and the outer casing, the support member is always held at a right position to ensure the prevention of deterioration of the alignment characteristic and image quality.

In case where the support member is fixed to both the second plate member and the outer casing, it is possible to suppress not only the movement or deformation of the second plate member toward the outer casing but also the movement or deformation of the second plate member in a direction leaving away from the outer casing, thereby better ensuring the prevention of deterioration of the alignment characteristic and image quality of the liquid crystal panel.

[Tenth embodiment]

In this embodiment shown in FIGS. 22 and 23, a gap $d_1$ is formed between a boss 3a and an inner unit 2, and elastic members (first elastic members) 51 are disposed at the gap $d_1$. The elastic members 51 are formed of silicone rubber in a ring shape, and screws BT are inserted therethrough to fix the elastic members 51. In other words, the inner unit 2 is attached to the upper housing member 3d in a hinged structure, whereby the inner unit 2 in appropriately held in a prescribed position while avoiding the transmission of a flexural moment from the upper housing member 3d to the inner unit 2.

In this embodiment, elastic members 11 and 8 are formed from a rubber adhesive (of, e.g., silicone rubber) capable of showing elasticity after the curing. More specifically, the elastic member 8 is formed by applying such an adhesive in a frame shape on the upper surface of a panel-fixing plate 7 and placing a liquid crystal panel (liquid crystal device) 1 thereon, followed by curing of the adhesive. The elastic member 11 may be formed in a similar manner.

When the liquid crystal display apparatus is dropped in a +Y direction shown in FIG. 23 to impinge a floor (not shown), the upper housing member 3d is elastically deformed as shown in FIG. 23 in a shape of a "soup dish" (according to an exaggerated expression). However, the upper housing member 3d (more exactly, the boss 3a) and the inner unit 2 are affixed to each other via the elastic member 51, a flexured moment is prevented from being transmitted from the upper housing member 3d to the inner unit 2. Accordingly, the inner unit 2 is not deformed but ensures its impact-absorbing function to prevent the deterioration the performances of the liquid crystal panel 1 including the alignment characteristic.

When the liquid crystal display apparatus is dropped in a −Y direction to impinge a floor (not shown), the upper housing member 3d may be deformed, but the flexural moment thereof is prevented from being transmitted to the inner unit 2. As a result, the inner unit 2 is not deformed but ensures its impact-absorbing function to prevent the deterioration of the alignment characteristic, etc. of the liquid crystal panel.

When the impact is removed thereafter, the housing member 51 is restored to the original shape, and the inner unit 2 is also restored to its prescribed position before the impact application.

As described above, according to this embodiment, the transmission of a flexural moment from the upper housing member 3d to the inner unit 2 is suppressed, thereby preventing the deformation of the inner unit 2 per se. As a result, the deformation of the liquid crystal panel 1 is prevented to well retain the alignment and image quality of the liquid crystal panel 1.

Further, at the time of assemblage, it is possible to provide the elastic member 51 with an initial deformation by clamping the screws BT to a prescribed degree, thereby to have the elastic members 51 also function as spring washers. As a result, additional washers can be removed to reduce the production cost.

Further, in this embodiment, the elastic members 51 are disposed in position in a state of being pierced with screws BT, so that the positional deviation of the elastic members is prevented to always retain a good impact relaxation function.

The gap $d_1$ may be determined in the production stage by appropriately selecting the protrusion amount of the boss 3a and the shape of the face plate-supporting member 10 and may be provided by affixing elastic members 51 of an appropriate thickness in a liquid crystal display apparatus of a hitherto proposed structure. In the latter case, it is possible to easily provide a liquid crystal display apparatus having excellent impact-resistance without requiring a design change of the face plate-supporting member 10 and the upper housing member 3d, thus avoiding an increase in production cost of the liquid crystal display apparatus.

In this embodiment, the elastic member 51 is disposed between the boss 3a on the housing member 3d and the edge of the inner unit 2. These portions (boss 3a and the edge of the inner unit 2) are naturally rich in rigidity in ±Y directions, so that no reinforcement is required regardless of impact concentration at the elastic member 51. Accordingly, it is possible to obviate an increase in production cost accompanying a design change.

In this embodiment, the boss 3a on the housing member 3d may be formed at selected positions for fixing by the screws BT or may be formed continuously along the peripheral edge of the inner unit 2. Further, in the case of forming the boss 3a continuously, the elastic member 51 may be disposed at distant positions of fixing by screws BT or may be continuously disposed along the continuously formed boss 3a.

In the above embodiments, the elastic member 51 is disposed between the boss 3a and the inner unit 2 but may also be disposed below the inner unit 2 (i.e., between the inner unit 2 and the screw BT) or may be disposed on both sides of the inner unit 2. As a result, the elastic member 51 may effectively function against an impact in the +Y direction or both the ±Y directions.

Further, it is also possible to form a gap $d_2$ between the upper housing member 3d and the face plate-supporting member 10 so as to avoid a contact between the upper housing member 3d and the face plate-supporting member 10 even when the upper housing member 3d is deformed. Further, it is also possible to insert an elastic member at the gap $d_2$ so as to prevent the intrusion of dust. Further, without forming such a gap $d_2$, it is possible to allow the upper housing member 3d to contact the face plate-supporting member 10. In this case, if the upper housing member 3d is formed thinly, the transmission of a flexural moment from the upper housing member 3d to the face plate-supporting member 10 can be obviated.

The elastic member 51 is formed of silicone rubber in the above embodiment but can be composed of a spring member such as coil spring or flat spring, or a cushioning member, such as an oil damper.

The elastic members 11 and 8 are formed from silicone rubber adhesive in the above embodiment but may be formed from any adhesive showing elasticity after curing. The elastic member 11 and 8 in the above embodiment are formed by curing an adhesive applied in a frame shape but may comprise a frame-shaped elastic member applied by double-coated tape or an adhesive. The frame-shaped member may be prepared by molding or stamping a sheet member.

[Eleventh embodiment]

In this embodiment of a liquid crystal display apparatus having a sectional structure as shown in FIG. 24, an inner unit 2 includes a plate member as a second member (hereinafter called a "fixing plate-supporting member") 7 and, between the fixing plate-supporting member 7 and a liquid crystal panel (liquid crystal device) 1, a panel-fixing plate (third member) 17 is disposed. The panel-fixing plate 17 is provided with an opening 17b in a region corresponding to the display area of the liquid crystal panel 1 and a projection 17a on its upper surface. The liquid crystal panel 1 is fixed via an elastic member (third elastic member) 8 to the panel-fixing plate 17 similarly as in Tenth embodiment, and a driver board 5 is affixed to the projection 17a. A face plate-supporting member 10 and the panel-fixing plate 17 are affixed to the fixing plate-supporting member 7 by means of screws, etc. (not shown). Between the panel-fixing plate 17 and the fixing plate-supporting member 7, an elastic member (third elastic member) 18 is disposed along the opening 17b. In this embodiment, an almost closed space 19a is defined by the liquid crystal panel 1, the elastic member 8, the panel-fixing plate 17, the elastic member 18 and the fixing plate-supporting member 7.

When the liquid crystal display apparatus is dropped in a +Y direction to impinge a floor (not shown), the upper housing member 3d is deformed toward a shape of a "soup dish". However, as the upper housing member 3d (more accurately a boss 3a thereon) and the inner unit 2 are affixed to each other via an elastic member 51. The transmission of a flexural moment from the upper housing member 3d to the inner unit 2 is hindered. As a result, the inner unit 2 is not deformed but ensures a sufficient impact absorption function to prevent the deterioration of the alignment characteristic, etc., of the liquid crystal panel.

Further, when the liquid crystal display apparatus is dropped in a −Y direction to impinge a floor (not shown), the upper housing member 3d is deformed but the transmission of a flexural moment from the housing member 3d to the inner unit 2 is hindered similarly as above. As a result, the inner unit is not deformed but ensures a sufficient absorption function to prevent the deterioration of the alignment characteristic, etc. of the panel.

In the case of dropping in the +Y direction of the liquid crystal display apparatus, the liquid crystal panel 1 tends to be deformed in the same direction. However, as the elastic members 8 and 18 are disposed between the liquid crystal panel 1 and the fixing plate-supporting member 7, and as the almost closed spaces 13 and 19a function as an air damper, the deformation of the liquid crystal panel 1 is suppressed.

According to this embodiment, the impact transmission to the liquid crystal panel 1 is alleviated by the elasticity of the elastic member 18.

Similar effects as in Tenth embodiment are accomplished.

Thus, the transmission of a flexured moment from the upper housing member 3d to the inner unit 2 is suppressed, thereby preventing the deformation of the inner unit 2 per se. As a result, the deformation of the liquid crystal panel 1 is prevented to well retain the alignment and image quality of the liquid crystal panel 1.

Further, by providing the elastic member 51 with some degree of initial deformation, the use of spring washers can be obviated to lower the production cost. Further, the elastic members 51 are disposed in a state of being pierced by the screws BT, so that the positional deviation of the elastic members 51 is prevented to always retain a good impact relaxation effect.

[Twelfth embodiment]

A liquid crystal display apparatus according to this embodiment shown in FIG. 25, has a structure similar to that in the previous embodiment except for using a different structure of panel-fixing plate (third member) 61.

That is, in this embodiment, the panel-fixing plate 61 is composed of three portions of a panel fixing portion 17, an elastic portion 21 and an affixed portion 20. The panel-fixing portion 17 is provided with an opening 17b similarly as in the pervious embodiment and a projection 17a for carrying a driver board 5. The liquid crystal panel 1 is affixed to the upper surface of the panel-fixing portion 17. On the other hand, the affixed portion 20 is disposed in a position and a shape surrounding the panel-fixing portion 17, and the elastic portion 21 is formed between the affixed portion 20 and the panel-fixing portion 17. This structure of the panel-fixing plate 61 may be formed by disposing the affixed portion (member) 20 and the panel-fixing portion (member) 17 in the above-mentioned positional relationship, and filling a gap therebetween with a rubber adhesive, followed by curing. The affixed portion 20 is fixed by the fixing plate-supporting member (second member) 7 and the face plate-supporting member 10, thereby to constitute an inner unit 2.

According to this embodiment, the panel-fixing portion 17 is supported by the elastic portion in a state of hanging in space. As a result, even if the upper housing member 3d is deformed as in the previous embodiment, the liquid crystal panel 1 is not affected by the deformation. Further, the transmission of a vibration from the affixed portion 20 of the panel-fixing portion 17 is suppressed. As a result, good alignment characteristic and image quality are retained.

In this embodiments, similar effects as in the previous embodiments are also accomplished.

[Thirteenth embodiment]

In this embodiment of liquid crystal display apparatus shown in FIG. 26, the fixing plate-supporting member 7 in the previous embodiment is replaced by a side light-type backlight device (second member) 27. The backlight device 27 is supported by a backlight-supporting member 26, which is fixed at its end to a face plate-supporting member 10 and a panel-fixing plate (third member) 17. The backlight-supporting member 26 is provided with an opening 17b in a region corresponding to the display area of the liquid crystal panel 1, and the backlight device 27 is disposed so as to close the opening 17b. Further, between the backlight-supporting member 26 and the panel-fixing plate 17, an elastic member 18 is disposed along the opening 17b, so that an almost closed space 19 is defined by the backlight device 27, the liquid crystal panel 1, the backlight-supporting member 26, the elastic member 18, the panel-fixing plate 17 and the elastic member 8. The backlight device 27 includes a light-guide member 29 of a transparent acrylic plate and, on both sides of the light guide member 29, tubular light sources 28 of cold cathode tube, hot cathode tube, etc. Covering the light sources, a reflection plate 30 is disposed, so that light emitted from the light source is caused to proceed within the light guide member 29. A reflection sheet (not shown) is disposed on the lower surface of the light guide member 29 and a light-diffusive sheet (not shown) as a light-diffusion means is applied on the upper surface (facing the liquid crystal panel 1) of the light guide member 29 so as to direct scattered diffused light to the liquid crystal panel 1 for illumination. An inner unit 2 is constituted by the backlight device 27, the liquid crystal panel 1, the face plate-supporting member 10, etc.

According to this embodiment, the light guide member 29 is formed of a relatively thick and not-easily deformable acrylic plate, so that the light guide member 29 functions as a reinforcing member of the inner unit 2. As a result, even when a strong impact is applied, the deformation of the inner unit 2 per se is prevented.

In this embodiment, similar effects as in the previous embodiments are accomplished.

[Fourteenth embodiment]

Figure 27:
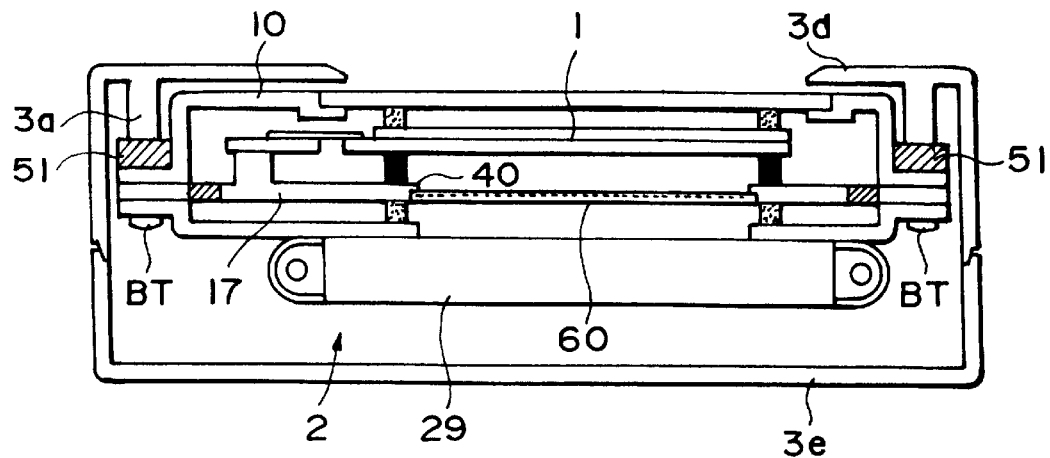

In this embodiment shown in FIG. 27, a light-diffusive sheet 60 is applied to a panel-fixing plate (third member) 17 so as to close an opening 40, unlike the light diffusive sheet applied on the light guide member 29 in the previous embodiment. The light diffusive sheet 60 may be composed of a plate member having a certain thickness giving a certain rigidity.

According to this embodiment, similar effects as in the previous embodiment are accomplished.

Thus, the light guide member 29 is formed of a relatively thick and not-easily deformable acrylic plate, so that the light guide member 29 functions as a reinforcing member of the inner unit 2. As a result, even when a strong impact is applied, the deformation of the inner unit 2 per se is prevented.

Further, the transmission of a flexural moment from the upper housing member 3d to the inner unit 2 is suppressed, thereby preventing the deformation of the inner unit 2 per se. As a result, the deformation of the liquid crystal panel 1 is prevented to well retain the alignment and image quality of the liquid crystal panel 1.

Further, by providing the elastic member 51 with some degree of initial deformation, the use of spring washers can be obviated to lower the production cost. Further, the elastic members 51 are disposed in a state of being pierced by the screws BT, so that the positional deviation of the elastic members 51 is prevented to always retain a good impact relaxation effect.

The light guide member 29 in the above embodiment is composed of an acrylic plate but can be a space functioning as a light guide member. The side light-type backlight member in the above embodiment may be replaced by a direct backing-type backlight.

The ferroelectric liquid crystal used in the liquid crystal panel 1 of the above embodiments can replaced by another liquid crystal, such as a nematic liquid crystal.

As described above, according to Tenth to Fourteenth embodiments of the present invention, a flexural moment accompanying the deformation of the housing member is prevented from being transferred to the inner unit, so that the deformation of the inner unit and the liquid crystal device therein is prevented, whereby good alignment characteristic and image quality of the liquid crystal device are retained.

Further, in the case where the inner unit is constituted by first and second members disposed with a prescribed spacing therebetween, a liquid crystal device disposed between the first and second members, a second elastic member disposed between the first member and the liquid crystal device, and a third elastic member disposed between the second member and the liquid crystal device, so as to define a first almost closed space by the liquid crystal device, the first member and the second elastic member, and a second almost closed space by the liquid crystal device, the second member and the third elastic member; the deformation of the liquid crystal device caused by application of an impact is suppressed by the elasticity of the second and third elastic members and the air damper effect of the almost closed spaces, whereby good alignment characteristic and image quality of the liquid crystal device are ensured.

Further, if a third member is disposed between the second member and the liquid crystal device, and the third member is designed to support the liquid crystal device and include a panel-fixing portion, an elastic portion and a panel-fixing portion, an applied impact is further relaxed by the elastic portion to better retain the alignment characteristic and the image quality of the liquid crystal device.

Further, in the case where the second member is constituted as a backlight device including a light guide member of a relatively thick acrylic plate, the light guide member functions as a reinforcing member in the inner unit. As a result, even when a strong impact is applied, the deformation of the inner unit per se is prevent to better retain the alignment characteristic of the liquid crystal device.

What is claimed is:

1. A display apparatus, comprising: a display panel, a housing member disposed behind and with a spacing from the display panel, and a face plate having a transparent region disposed in front of the display panel; said display apparatus further including:

a first elastic member disposed at a position surrounding a display region of the display panel between the display panel and the housing member so as to define a first almost closed space by the first elastic member, the display panel and the housing member, and a second elastic member disposed at a position surrounding a display area of the display panel between the display panel and the face plate so as to define a second almost closed space by the second elastic member, the display panel and the face plate.

2. A display apparatus according to claim 1, further comprising a drive circuit including a flexible film circuit connected to the display panel.

3. A display apparatus according to claim 1, further comprising a drive circuit including a rigid circuit board and a flexible film circuit carrying a drive IC chip thereon, said rigid circuit board being connected to the flexible film circuit which in turn is connected to the display panel.

4. A display apparatus according to claim 1, wherein said first elastic member has a sectional shape having a thickness in a direction perpendicular to the display panel and a width in a direction parallel to the display panel so that the width is smaller than the thickness.

5. A display apparatus according to claim 1, wherein the face plate has a transparent portion comprising a chemically reinforced glass sheet.

6. A display apparatus according to claim 1, wherein said face plate comprises a transparent substrate and a pair of optical films subjected to a non-glare treatment applied onto both surfaces of the substrate.

7. A display apparatus according to claim 1, wherein said housing member comprises a backlight device for illuminating the display panel.

8. A display apparatus according to claim 1, wherein said second elastic member has a hardness which is smaller than or equal to that of the first elastic member.

9. A display apparatus according to claim 1, wherein said second elastic member is compressed in a direction perpendicular to the display panel.

10. A display apparatus according to claim 1, further including a circuit board for driving the display panel disposed on the panel-fixing member, and a regulating member for regulating a movement in a direction perpendicular to the panel-fixing member.

11. A display apparatus according to claim 1, wherein said display panel comprises a liquid crystal panel containing a smectic liquid crystal as an optical modulation material.

12. A display apparatus according to claim 1, wherein there is defined an inner unit which includes the face plate as a first member and a second member as a portion of said housing member disposed with a prescribed spacing from the first member, the display panel disposed between the first and second members, the second elastic member disposed between the first member and the display panel, and the first elastic member disposed between the second member and the display panel, so as to define the first almost closed space by the display panel, the second member and the first elastic member, and the second almost closed space by the display panel, the first member and the second elastic member.

13. A display apparatus according to claim 4, wherein said first elastic member has a rubber hardness of at most 50 deg.

* * * * *

UNITED STATES PATENT AND TRADEMARK OFFICE
CERTIFICATE OF CORRECTION

PATENT NO. : 5,808,707
DATED : September 15, 1998
INVENTOR(S) : KENJI NIIBORI ET AL.

It is certified that error appears in the above-identified patent and that said Letters Patent is hereby corrected as shown below:

<u>COVER PAGE    [57] ABSTRACT</u>

Line 10, "and" should read --an--.

<u>COLUMN 5</u>

Line 44, "mean" should read --means--.

<u>COLUMN 13</u>

Line 34, "an" should be deleted.

<u>COLUMN 16</u>

Line 51, "in" (first occurrence) should read --is--.

<u>COLUMN 19</u>

Line 62, "embodiments," should read --embodiment,--.

UNITED STATES PATENT AND TRADEMARK OFFICE
CERTIFICATE OF CORRECTION

PATENT NO. : 5,808,707

DATED : September 15, 1998

INVENTOR(S) : KENJI NIIBORI ET AL.

It is certified that error appears in the above-identified patent and that said Letters Patent is hereby corrected as shown below:

COLUMN 21

Line 5, "can" should read --can be--.

Signed and Sealed this

Eighth Day of June, 1999

Attest:

Attesting Officer

Q. TODD DICKINSON

Acting Commissioner of Patents and Trademarks